United States Patent
Yamamoto et al.

(10) Patent No.: US 11,377,082 B2
(45) Date of Patent: Jul. 5, 2022

(54) BRAKING CONTROL DEVICE FOR VEHICLE

(71) Applicant: ADVICS CO., LTD., Kariya (JP)

(72) Inventors: Takayuki Yamamoto, Nagakute (JP); Hiroyuki Kodama, Kariya (JP); Hiroyuki Ando, Nagoya (JP)

(73) Assignee: ADVICS CO., LTD., Kariya (JP)

( * ) Notice: Subject to any disclaimer, the term of this patent is extended or adjusted under 35 U.S.C. 154(b) by 161 days.

(21) Appl. No.: 16/967,528

(22) PCT Filed: Feb. 5, 2019

(86) PCT No.: PCT/JP2019/003931
§ 371 (c)(1),
(2) Date: Aug. 5, 2020

(87) PCT Pub. No.: WO2019/156034
PCT Pub. Date: Aug. 15, 2019

(65) Prior Publication Data
US 2021/0229648 A1    Jul. 29, 2021

(30) Foreign Application Priority Data
Feb. 9, 2018  (JP) ............................. JP2018-021733

(51) Int. Cl.
*B60T 13/58*  (2006.01)
*B60L 7/26*  (2006.01)
*B60T 13/68*  (2006.01)

(52) U.S. Cl.
CPC ............. *B60T 13/586* (2013.01); *B60L 7/26* (2013.01); *B60T 13/686* (2013.01); *B60T 2270/604* (2013.01)

(58) Field of Classification Search
CPC ............. B60T 13/586; B60T 2270/604; B60T 13/686; B60L 7/26
See application file for complete search history.

(56) References Cited

U.S. PATENT DOCUMENTS

| | | | |
|---|---|---|---|
| 2016/0082937 A1* | 3/2016 | Nakaoka | B60T 8/321 303/15 |
| 2016/0096434 A1* | 4/2016 | Nakaoka | B60W 10/192 701/78 |

FOREIGN PATENT DOCUMENTS

| | | | |
|---|---|---|---|
| JP | 1192936 A | * | 7/1999 |
| JP | 2013107561 A | | 6/2013 |

(Continued)

OTHER PUBLICATIONS

International Search Report (PCT/ISA/210) dated May 14, 2019, by the Japan Patent Office as the International Searching Authority for International Application No. PCT/JP2019/003931.

(Continued)

*Primary Examiner* — Pamela Rodriguez
(74) *Attorney, Agent, or Firm* — Buchanan Ingersoll & Rooney PC

(57) ABSTRACT

A braking control device includes a master unit including a master chamber connected to a front wheel cylinder and a servo chamber that applies forward force opposing a reverse force applied to a master piston by the master chamber to the master piston, a pressure adjustment unit that adjusts brake fluid discharged by a pump to a first liquid pressure by a first solenoid valve and introduces the first liquid pressure to a rear wheel cylinder, and adjusts the first liquid pressure to decrease to a second liquid pressure by a second solenoid valve and introduces the second liquid pressure to the servo chamber; and a regenerative coordination unit having an input piston operable in conjunction with a braking operation member and an input cylinder fixed to the master cylinder, and in which a gap between the master piston and the input piston is controlled by the second liquid pressure.

4 Claims, 5 Drawing Sheets

(56) References Cited

FOREIGN PATENT DOCUMENTS

| JP | 2016165913 A | 9/2016 |
|---|---|---|
| JP | WO-2018/043110 A1 * | 3/2018 |
| JP | 2019059294 A | 4/2019 |
| JP | WO-2020/004347 A1 * | 1/2020 |

OTHER PUBLICATIONS

Written Opinion (PCT/ISA/237) dated May 14, 2019, by the Japan Patent Office as the International Searching Authority for International Application No. PCT/JP2019/003931.

* cited by examiner

BRAKING CONTROL DEVICE FOR VEHICLE

TECHNICAL FIELD

The present invention relates to a braking control device for a vehicle.

BACKGROUND ART

Patent Literature 1 describes that, for the purpose of "preventing decrease in braking force at the time of backup in a vehicle braking system to which a by-wire brake system is applied", "when a failure such as an abnormality in a communication network occurs in the vehicle braking system, first and second shut-off valves are opened to cause a slave cylinder and a master cylinder to communicate to each other. Furthermore, first and second slave pistons are controlled to maintain the current positions by driving the motor. Thereafter, when the operation of the brake pedal is released, the operation of the motor is stopped."

In the device described in Patent Literature 1, the slave cylinder drives a ball screw shaft with the power of a motor serving as an electric actuator, and generates brake liquid pressure by the first and second slave pistons based on the drive of the ball screw shaft. The first and second slave pistons are each biased in the retreating direction by a coil spring. The ball screw shaft is driven in the advancing direction by the power of the motor, and moves the first and second slave pistons in the advancing direction against the biasing force of the coil spring, thereby generating brake liquid pressure. In other words, in this device, a tandem-type slave cylinder is employed, a ball screw is provided on the center axis of the slave cylinder, the rotational power of the electric motor is converted into linear power of the slave piston by the ball screw, and the braking liquid pressure is generated. Since the dimension of the slave cylinder in the longitudinal direction is long due to its structure, it is desired to shorten the length.

The applicant has developed a braking control device for a vehicle as described in Patent Literature 2. Specifically, the device includes "a mechanical regulator that sends out an output pressure corresponding to the pilot pressure supplied to a pilot chamber from an output port based on the brake liquid pressure of a high-pressure source, a switching unit connected to the pilot chamber, a first pilot pressure generating device connected to the pilot chamber by way of the switching unit to supply a first pilot pressure to the pilot chamber, a second pilot pressure generating device connected to the pilot chamber by way of the switching unit to supply a second pilot pressure to the pilot chamber, and a wheel cylinder that generates a brake force based on an output pressure supplied from the output port of the mechanical regulator, where the switching unit supplies either one of the first pilot pressure and the second pilot pressure to the pilot chamber".

This device also employs a tandem-type master cylinder. The master cylinder includes a master piston which is arranged with a separation distance B in the advancing direction of an input piston and is slidable in the axis line direction independently of the input piston. Furthermore, a reaction force chamber is formed between an end face on the distal end side of the input piston and a partition wall serving as the bottom portion of the input cylinder hole, and a reaction force pressure corresponding to the amount of movement of the input piston is generated in the reaction force chamber. Since the reaction force chamber is provided at the end of the master cylinder, a reduction in dimension in the center axis direction is also desired in this configuration.

In order to solve this problem, the applicant has developed a braking control device as described in Patent Literature 3. The device is configured to include "a pressure adjustment unit that is configured by an electric pump and a solenoid valve, and that adjusts the brake fluid discharged by the electric pump to the adjusted liquid pressure by the solenoid valve and introduces the adjusted liquid pressure to a rear wheel cylinder", and "a master unit configured by a master cylinder and a master piston, and that includes "a master chamber connected to a front wheel cylinder" and "a servo chamber to which the adjusted liquid pressure is introduced to apply a forward force, against a reverse force applied to the master piston by the master chamber, to the master piston"".

In the braking control device, in addition to the reduction of the dimension of the device in the longitudinal direction, it is also desired that the braking liquid pressure of the front wheel system and the braking liquid pressure of the rear wheel system can be separately controlled to different liquid pressures. This is based on the need to achieve both vehicle stability at time of braking and the amount of regenerative energy at high level in a vehicle equipped with an energy regeneration device.

CITATIONS LIST

Patent Literature

Patent Literature 1: Japanese Unexamined Patent Publication No. 2016-165913
Patent Literature 2: Japanese Unexamined Patent Publication No. 2013-107561
Patent Literature 3: Japanese Unexamined Patent Application No. 2017-184272

SUMMARY OF INVENTION

Technical Problems

An object of the present invention is to provide a braking control device for a vehicle, in which the dimension in the longitudinal direction is reduced, and the braking liquid pressure of the front wheel system and the braking liquid pressure of the rear wheel system can be individually controlled.

Solutions to Problems

The present invention relates to a vehicle in which a regenerative generator (GN) is provided on a front wheel (WHf) of the vehicle. A braking control device for a vehicle according to the present invention includes "a master unit (YM) configured by a master cylinder (CM) and a master piston (PM), and includes a master chamber (Rm) connected to a front wheel cylinder (CWf) of the vehicle and a servo chamber (Rs) that applies a forward force (Fa) opposing a reverse force (Fb) applied to the master piston (PM) by the master chamber (Rm) to the master piston (PM)"; "a pressure adjustment unit (YC) configured by an electric pump (DC) and first and second solenoid valves (UB, UC), and that adjusts a brake fluid (BF) discharged by the electric pump (DC) to a first liquid pressure (Pb) by the first solenoid valve (UB) and introduces the first liquid pressure (Pb) to a rear wheel cylinder (CWr) of the vehicle, and adjusts the first liquid pressure (Pb) to decrease to a second liquid pressure (Pc) by the second solenoid valve (UC) and introduces the second liquid pressure (Pc) to the servo chamber (Rs)"; and "a regenerative coordination unit (YK) configured by an input piston (PK) that operates in conjunction with a braking operation member (BP) of the vehicle and an input cylinder (CN) fixed to the master cylinder (CM), and in which a gap (Ks) between the master piston (PM) and the input piston (PK) is controlled by the second liquid pressure (Pc)".

The present invention relates to a vehicle in which a regenerative generator (GN) is provided on a rear wheel (WHr) of the vehicle. A braking control device for a vehicle according to the present invention includes "a master unit (YM) configured by a master cylinder (CM) and a master piston (PM), and includes a master chamber (Rm) connected to a front eel cylinder (CWf) of the vehicle and a servo chamber (Rs) that applies a forward force (Fa) opposing a reverse force (Fb) applied to the master piston (PM) by the master chamber (Rm) to the master piston (PM)"; "a pressure adjustment unit (YC) configured by an electric pump (DC) and first and second solenoid valves (UB, UC), and that adjusts a brake fluid (BF) discharged by the electric pump (DC) to a first liquid pressure (Pb) by the first solenoid valve (UB) and introduces the first liquid pressure (Pb) to the servo chamber (Rs), and adjusts the first liquid pressure (Pb) to decrease to a second liquid pressure (Pc) by the second solenoid valve (UC) and introduces the second liquid pressure (Pc) to a rear wheel cylinder (CWr) of the vehicle"; and "a regenerative coordination unit (YK) configured by an input piston (PK) that operates in conjunction with a braking operation member (BP) of the vehicle and an input cylinder (CN) fixed to the master cylinder (CM), and in which a gap (Ks) between the master piston (PM) and the input piston (PK) is controlled by the first liquid pressure (Pb)".

According to the above configuration, the first liquid pressure Pb and the second liquid pressure Pc are adjusted individually and independently of the braking operation. Thus, the ratio of the braking force between the front wheel and the rear wheel is optimized, the vehicle stability is maintained, and at the same time, a regenerable energy amount can be sufficiently ensured.

DESCRIPTION OF EMBODIMENTS

Figure 1:
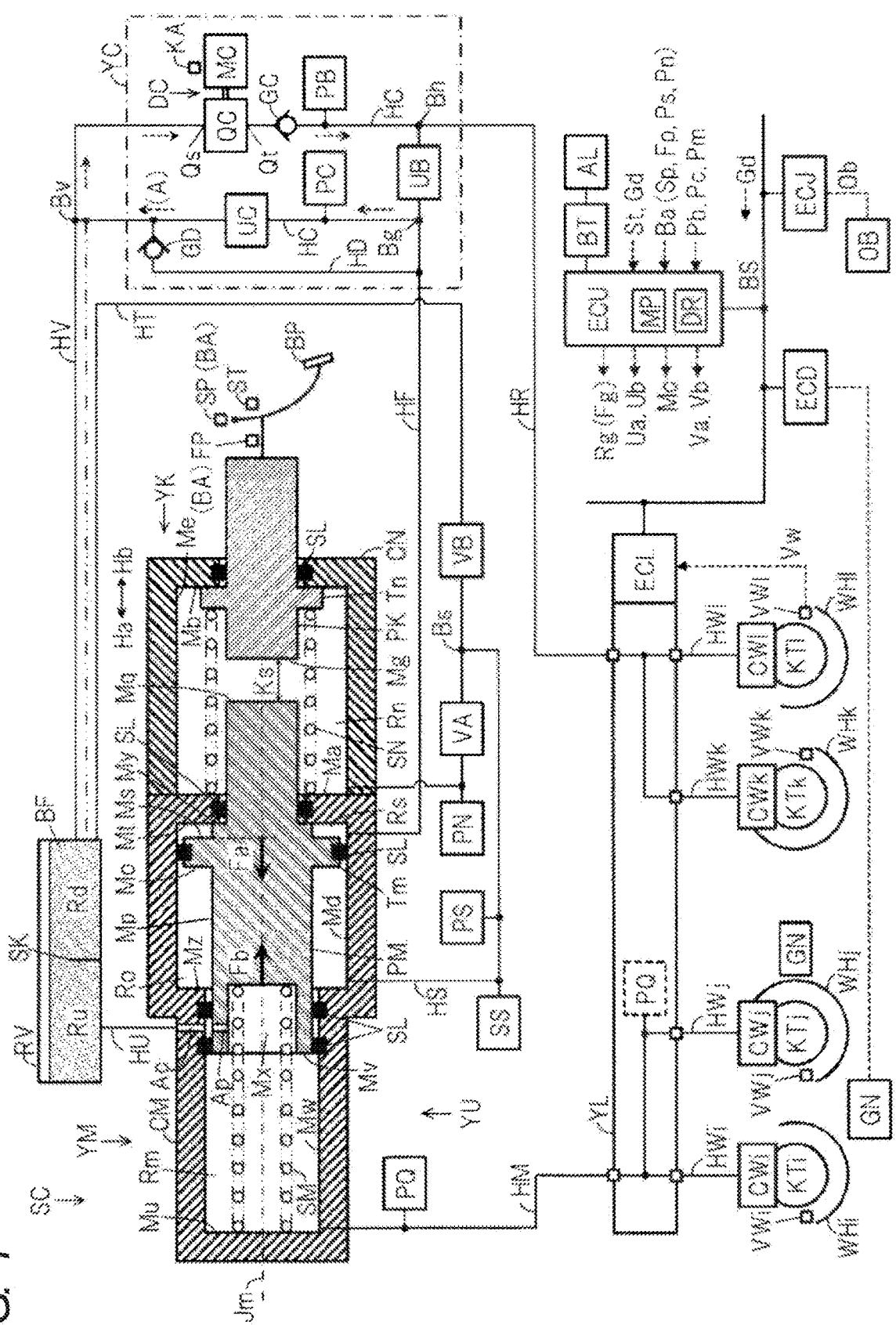
FIG. 1 is an overall configuration view for describing a first embodiment of a braking control device SC for a vehicle according to the present invention.

Symbols of Configuring Members, Etc., and Subscripts at the End of the Symbols

In the following description, configuring members, calculation processes, signals, characteristics, and values having the same symbol such as "ECU" have the same functions. Subscripts "i" to "l" added to the end of various symbols are comprehensive symbols indicating which wheel they relate to. Specifically, "i" indicates a right front wheel, "j" indicates a left front wheel, "k" indicates a right rear wheel, and "l" indicates a left rear wheel. For example, each of the four wheel cylinders is described as a right front wheel cylinder CWi, a left front wheel cylinder CWj, a right rear wheel cylinder CWk, and a left rear wheel cylinder CWl. Furthermore, the subscripts "i" to "l" at the end of the symbols can be omitted. When the subscripts "i" to "l" are omitted, each symbol represents a generic name of each of the four wheels. For example, "WH" represents each wheel, and "CW" represents each wheel cylinder.

The suffixes "f" and "r" added to the end of various symbols are comprehensive symbols indicating which of the two braking systems, for the front and rear wheels, they are related to. Specifically, "f" indicates the front wheel system, and "r" indicates the rear wheel system. For example, in the wheel cylinder CW of each wheel, it is described as a front wheel cylinder CWf(=CWi, CWj) and a rear wheel cylinder CWr(=CWk, CWl). Furthermore, the subscripts "f" and "r" at the end of the symbols can be omitted. When the suffixes "f" and "r" are omitted, each symbol represents a generic name of each of the two braking systems. For example, "CW" represents a wheel cylinder in the front and rear braking systems.

The operation of the braking control device SC is in an appropriate state, and the braking performed by the braking control device SC is referred to as "control braking". When the operation of the braking control device SC is in a malfunction state, braking only by the driver's operation force is referred to as "manual braking". Therefore, in manual braking, the braking control device SC is not used.

First Embodiment of Braking Control Device for Vehicle According to the Present Invention A first embodiment of the braking control device SC according to the present invention will be described with reference to an overall configuration view of FIG. 1. In a general vehicle, fluid passages of two systems are employed to secure redundancy. The fluid passage is a passage for moving the brake fluid BF which is working liquid of the braking control device, and corresponds to a braking pipe, a fluid path of a fluid unit, a hose, and the like. The inside of the fluid passage is filled with the brake fluid BF. A so-called front-rear type (also referred to as "H type") is adopted for the fluid passages of two systems in the braking control device SC. The front wheel system connected to the front wheel cylinders CWi, CWj (also referred to as "front wheel cylinder CWf"), and the rear wheel system connected to the rear wheel cylinders CWk, CWl (also referred to as "rear wheel cylinder CWr") form a two-system fluid passage. In the braking control device SC, the brake fluid BF is supplied from a reservoir RV and the liquid pressure Pw of the wheel cylinder CW is increased, but in the fluid passage, the side closer to the reservoir RV (the side farther from the wheel cylinder CW) is referred to as "upstream side" or "upper part", and the side closer to the wheel cylinder CW (the side farther from the reservoir RV) is referred to as "downstream side" or "lower part".

The vehicle is equipped with an electric motor GN for driving. That is, the vehicle is a hybrid vehicle or an electric vehicle. The electric motor GN for driving also functions as a generator (power generator) for energy regeneration. For example, the generator GN is provided on the front wheel WHf. The electric motor/generator GN is controlled by a drive controller ECD.

The vehicle is provided with a distance sensor OB so as to detect a distance (relative distance) Ob between an object existing in front of the own vehicle (another vehicle, fixed object, person, bicycle, etc.) and the own vehicle. For example, a camera, a radar, or the like is employed as the distance sensor OB. The distance Ob is input to a driving assistance controller ECJ. The driving assistance controller ECJ calculates a required deceleration Gd based on the relative distance Ob. The required deceleration Gd is a target value of the vehicle deceleration for automatically braking on behalf of the driver without colliding with an object in front of the vehicle.

In the braking control device SC, a so-called regenerative coordination control (coordination between regenerative braking and friction braking) is executed. The regenerative coordination control is executed not only at the time of braking by the driver but also at the time of automatic braking by the driving assistance controller ECJ. The vehicle including the braking control device SC includes a braking operation member BP, a wheel cylinder CW, a reservoir RV, and a wheel speed sensor VW.

The braking operation member (e.g., brake pedal) BP is a member operated by the driver to decelerate the vehicle. The braking torque of the wheel WH is adjusted, and the braking force F (generic name of front wheel and rear wheel braking forces Ff, Fr) is generated at the wheel WH by operating the braking operation member BP. Specifically, a rotating member (e.g., brake disc) KT is fixed to the wheel WH of the vehicle. A brake caliper is arranged so as to sandwich the rotating member KT, and the wheel cylinder CW is provided thereat. As the pressure (braking liquid pressure) Pw of the brake fluid BF in the wheel cylinder CW is increased, the friction member (e.g., brake pad) is pressed against the rotating member KT. Since the rotating member KT and the wheel WH are fixed to rotate integrally, a braking torque (consequently, front wheel and rear wheel friction braking forces Fmf, Fmr) is generated at the wheel WH by the frictional force generated at this time.

The reservoir (atmospheric pressure reservoir) RV is a tank for the working liquid, and the brake fluid BF is stored inside. The lower part of the reservoir RV is partitioned by a partition plate SK into a master reservoir chamber Ru connected to a master cylinder chamber Rm, and a pressure adjusting reservoir chamber Rd connected to pressure adjustment unit YC. In a state where the reservoir RV is filled with the brake fluid BF, the liquid level of the brake fluid BF is above the height of the partition plate SK. For this reason, the brake fluid BF can freely move between the master reservoir chamber Ru and the pressure adjusting reservoir chamber Rd beyond the partition plate SK. On the other hand, when the amount of brake fluid BF in the reservoir RV decreases and the liquid level of the brake fluid BF becomes lower than the height of the partition plate SK, the master reservoir chamber Ru and the pressure adjusting reservoir chamber Rd become independent reservoirs.

Each wheel WH includes a wheel speed sensor VW to detect a wheel speed Vw. The signal of the wheel speed Vw is used for independent braking control for each wheel such as anti-skid control (control for suppressing excessive deceleration slip of the wheel), vehicle stabilization control (control for suppressing excessive oversteer, understeer behavior), and the like. The vehicle body speed Vx is calculated based on each wheel speed Vw detected by the wheel speed sensor VW.

Braking Control Device SC

The braking control device SC is configured to include an upper fluid unit YU and a lower fluid unit YL. Here, the upper fluid unit YU is a fluid unit closer to the master cylinder CM, and the lower fluid unit YL is a fluid unit closer to the wheel cylinder CW. The inside of each fluid unit YU, YL is made into a liquid tight state by the brake fluid BF. The upper fluid unit YU is controlled by an upper controller ECU, and the lower fluid unit YL is controlled by a lower controller ECL. The upper controller ECU and the lower controller ECL are connected through a communication bus BS so that respective signals (sensor detected value, calculated value, etc.) are shared.

The upper fluid unit YU of the braking control device SC is configured by an operation amount sensor BA, an operation switch ST, a stroke simulator SS, a master unit YM, a pressure adjustment unit YC, and a regenerative coordination unit YK.

The operation amount sensor BA is provided so as to detect an operation amount Ba of the braking operation member (brake pedal) BP by the driver. An operation displacement sensor SP that detects an operation displacement Sp of the braking operation member BP is provided as the operation amount sensor BA. Furthermore, an operation force sensor FP is provided to detect an operation force Fp of the braking operation member BP. Moreover, a simulator liquid pressure sensor PS is provided as the operation amount sensor BA so as to detect a liquid pressure (simulator liquid pressure) Ps in a stroke simulator SS. An input liquid pressure sensor PN is provided so as to detect the liquid pressure (input liquid pressure) Pn in the input chamber Rn of the regenerative coordination unit YK. The operation amount sensor BA is a generic term for the operation displacement sensor SP and the like, and as the braking operation amount Ba, at least one of the operation displacement Sp, the operation force Fp, the simulator liquid pressure Ps, and the input liquid pressure Pn is adopted. The detected braking operation amount Ba is input to the upper controller ECU.

The braking operation member BP is provided with an operation switch ST so as to detect whether or not the driver operated the braking operation member BP. When the braking operation member BP is not operated (i.e., at the time of non-braking), an OFF signal is output as the operation signal St by the braking operation switch ST. On the other hand, when the braking operation member BP is being operated (i.e., at the time of braking), an ON signal is output as the operation signal St. The braking operation signal St is input to the controller ECU.

The stroke simulator (also simply referred to as a simulator) SS is provided to cause the braking operation member BP to generate an operation force Fp. A piston and an elastic body (e.g., compression spring) are provided inside the simulator SS. When the brake fluid BF is moved into the simulator SS, the piston is pushed by the inflowing brake fluid BF. A force is applied to the piston in a direction of preventing the inflow of the brake fluid BF by the elastic body, so that the operation force Fp when the braking operation member BP is operated is formed.

Master Unit YM

The master unit YM adjusts the liquid pressure (front wheel braking liquid pressure) Pwf in the front wheel cylinder CWf through the master cylinder chamber Rm. The master unit YM is formed to include a master cylinder CM, a master piston PM, and a master elastic body SM.

The master cylinder CM is a cylinder member having a bottom portion. The master piston PM is a piston member inserted inside the master cylinder CM, and is movable in conjunction with the operation of the braking operation member BP. The inside of the master cylinder CM is partitioned into three liquid pressure chambers Rm, Rs, and Ro by the master piston PM.

A groove portion is formed in a first inner peripheral portion Mw of the master cylinder CM, and two seals SL are fitted into the groove portion. An outer peripheral portion (outer peripheral cylindrical surface) Mp of the master piston PM and the first inner peripheral portion (inner peripheral cylindrical surface) Mw of the master cylinder CM are sealed by the two seals SL. The master piston PM is smoothly movable along a center axis Jm of the master cylinder CM.

The master cylinder chamber (also simply referred to as the "master chamber") Rm is a liquid pressure chamber defined by the "first inner peripheral portion Mw and a first bottom portion (bottom surface) Mu of the master cylinder CM", and a first end Mv of the master piston PM. A master cylinder fluid passage HM is connected to the master chamber Rm, and it is ultimately connected to the front wheel cylinder CWf through the lower fluid unit YL.

The master piston PM is provided with a flange portion (flange) Tm. The inside of the master cylinder CM is partitioned by the flange portion Tm into a servo liquid pressure chamber (also simply referred to as "servo chamber") Rs and a rear liquid pressure chamber (also simply referred to as "rear chamber") Ro. A seal SL is provided on the outer peripheral portion of the flange portion Tm, so that the flange portion Tm and a second inner peripheral portion Md of the master cylinder CM are sealed. The servo chamber Rs is a liquid pressure chamber defined by "the second inner peripheral portion Md and a second bottom portion (bottom surface) Mt of the master cylinder CM" and a first surface Ms of the flange portion Tm of the master piston PM. The master chamber Rm and the servo chamber Rs are arranged to face each other with the master piston PM (particularly, flange portion Tm) interposed therebetween. A front wheel pressure adjusting fluid passage HF is connected to the servo chamber Rs, and a second adjusted liquid pressure Pc is introduced from the pressure adjustment unit YC.

The rear chamber Ro is a liquid pressure chamber defined by the second inner peripheral portion Md of the master cylinder CM, a stepped portion Mz, and a second surface Mo of the flange portion Tm of the master piston PM. The rear chamber Ro is located between the master liquid pressure chamber Rm and the servo liquid pressure chamber Rs in the direction of the center axis Jm. A simulator fluid passage HS is connected to the rear chamber Ro. The amount of brake fluid BF in the upper fluid unit YU is adjusted by the rear chamber Ro.

The first end Mv of the master piston PM is provided with a depression Mx. A master elastic body (e.g., compression spring) SM is provided between the depression Mx and the first bottom portion Mu of the master cylinder CM. The master elastic body SM presses the master piston PM against the second bottom portion Mt of the master cylinder CM in the direction of the center axis Jm of the master cylinder CM. At the time of non-braking, the stepped portion My of the master piston PM is in abutted against the second bottom portion Mt of the master cylinder CM. The position of the master piston PM in this state is referred to as "the initial position of the master unit YM".

A through-hole Ac is provided in the master cylinder CM between two seals SL (e.g., cup seal). The through-hole Ac is connected to the master reservoir chamber Ru through a resupply fluid passage HU. Furthermore, a through-hole Ap is provided near the first end Mv of the master piston PM. Whets the master piston PM is at the initial position, the master chamber Rm is in a communicating state with the reservoir RV (particularly, the master reservoir chamber Ru) through the through-holes Ac and Ap and the resupply fluid passage HU.

The master chamber Rm applies, to the master piston PM, a biasing force Fb (referred to as "reverse force") in the retreating direction Hb along the center axis Jm by its internal pressure ("master cylinder liquid pressure", also referred to as "master liquid pressure") Pm. The servo chamber Rs applies, to the master piston PM, a biasing force Fa (referred to as "forward force") opposing the reverse force Fb by its internal pressure (i.e., the introduced second adjusted liquid pressure Pc). That is, in the master piston PM, the forward force Fa by the liquid pressure Pv (=Pc) in the servo chamber Rs and the reverse force Fb by the liquid pressure (master liquid pressure) Pm in the master chamber Rm oppose each other (face each other) in the direction of the center axis Jm, and are statically balanced. A master liquid pressure sensor PQ is provided so as to detect the master liquid pressure Pm. For example, the master liquid pressure sensor PQ can be provided in the master cylinder fluid passage HM. Furthermore, the master liquid pressure sensor PQ may be included in the lower fluid unit YL.

For example, a pressure receiving area of the first surface Ms of the flange portion Tm (i.e., a pressure receiving area of the servo chamber Rs) rs is set to be equal to a pressure receiving area of the first end Mv of the master piston PM (i.e., a pressure receiving area of the master chamber Rm) rm. In this case, the liquid pressure Pc introduced into the servo chamber Rs (as a result, the servo liquid pressure Pv) and the liquid pressure Pm in the master chamber Rm are the same in a steady state. At this time, the forward force Fa (=Pc×rs) and the reverse force Fb (=Pm×rm (+elastic force of SM)) are balanced.

Pressure Adjustment Unit YC

The pressure adjustment unit YC adjusts the liquid pressure Pwf of the front wheel cylinder CWf and the liquid pressure Pwr of the rear wheel cylinder CWr independently and individually. Specifically, the braking liquid pressure Pwf of the front wheels WHf provided with the generator GN is adjusted to be less than or equal to the braking liquid pressure Pwr of the rear wheels WHr not provided with the generator GN. The pressure adjustment unit YC includes an electric pump DC, a check valve GC, first and second pressure adjusting valves UB, UC, and first and second adjusted liquid pressure sensors PB, PC.

The electric pump DC is configured by a set of one electric motor MC and one fluid pump QC. In the electric pump DC, the electric motor MC and the fluid pump QC are fixed such that the electric motor MC and the fluid pump QC rotate integrally. The electric pump DC (particularly, the electric motor MC) is a power source for increasing the braking liquid pressure Pw at the time of control braking. The electric motor MC is controlled by the controller ECU.

For example, a three-phase brushless motor is employed as the electric motor MC. The brushless motor MC is provided with a rotation angle sensor KA that detects a rotor position (rotation angle) Ka. A switching element of a bridge circuit is controlled based on the rotation angle (actual value) Ka, and the electric motor MC is driven. The direction (i.e., excitation direction) of the energization amount of the coils of each of the three phases (U phase, V phase, W phase) is sequentially switched, and the brushless motor MC is rotationally driven. A drive circuit DR is provided with an energization amount sensor that detects an actual energization amount Ia (generic name of each phase) of the electric motor MC. A current sensor is provided as an energization amount sensor, and a supply current Ia to the electric motor MC is detected.

A suction port Qs of the fluid pump QC is connected to the reservoir RV (particularly, the pressure adjusting reservoir chamber Rd) through the first reservoir fluid passage HV. A pressure adjusting fluid passage HC is connected to a discharge port Qt of the fluid pump QC. By driving the electric pump DC (particularly, the fluid pump QC), the brake fluid BF is suctioned from the first reservoir fluid passage HV through the suction port Qs, and discharged from the discharge port Qt to the pressure adjusting fluid passage HC. For example, a gear pump is employed as the fluid pump QC.

The check valve GC (also referred to as a "check valve") is interposed in the pressure adjusting fluid passage HC. The check valve GC allows the brake fluid BF to move from the first reservoir fluid passage HV to the pressure adjusting fluid passage HC, but inhibits the movement from the pressure adjusting fluid passage HC to the reservoir fluid passage HV (i.e., backflow of the brake fluid BF). That is, the electric pump DC is rotated only in one direction. An end Bv on the side opposite to the discharge port Qt of the pressure adjusting fluid passage HC is connected to the first reservoir fluid passage HV.

Two pressure adjusting valves UB and UC are provided in series in the pressure adjusting fluid passage HC. Specifically, the pressure adjusting fluid passage HC is provided with a first pressure adjusting valve UB (corresponds to "first solenoid valve"). Then, the second pressure adjusting valve UC (corresponds to the "second solenoid valve") is arranged between the first pressure adjusting valve UB and the portion Bv. The first and second pressure adjusting valves UB, UC are linear type solenoid valves (also referred to as "proportional valve" or "differential pressure valve") in which the valve opening amount (lift amount) is continuously controlled based on the energized state (e.g., supply current). The first and second pressure adjusting valves UB, UC are controlled by the controller ECU based on the drive signals Ub, Uc. A normally-open solenoid valve is employed as the first and second pressure adjusting valves UB, UC.

The brake fluid BF is pumped from the first reservoir fluid passage HV through the suction port Qs of the fluid pump QC, and is discharged from the discharge port Qt. Then, the brake fluid BF passes through the check valve GC, the first pressure adjusting valve UB, and the second pressure adjusting valve UC and is returned to the reservoir fluid passage HV. In other words, a reflux path (a fluid passage in which the flow of the brake fluid BF again returns to the original flow) is formed by the first reservoir fluid passage and the pressure adjusting fluid passage HC, and the check valve GC and the first and second pressure adjusting valves UB, UC are interposed in series in the reflux path.

When the electric pump DC is operating, the brake fluid BF is refluxed in the order of "HV→QC (Qs→Qt)→GC→UB→UC→HV" (i.e., "reflux path" is formed) as shown by a broken arrow (A). When the first and second pressure adjusting valves UB, UC are in a fully open state (at the time of non-energization as they are a normally-open type), the liquid pressures (adjusted liquid pressures) Pb, Pc in the pressure adjusting fluid passage HC are both approximately "0 (atmospheric pressure)". When the energization amount to the first pressure adjusting valve UB is increased and the reflux path is throttled by the pressure adjusting valve UB, the liquid pressure (first adjusted liquid pressure, corresponds to "first liquid pressure") Pb between the fluid pump QC and the first pressure adjusting valve UB in the pressure adjusting fluid passage HC is increased from "0". Furthermore, when the energization amount to the second pressure adjusting valve UC is increased and the reflux path is throttled by the pressure adjusting valve UC, the liquid pressure (second adjusted liquid pressure, corresponds to "second liquid pressure") Pc between the first pressure adjusting valve UB and the second pressure adjusting valve UC in the pressure adjusting fluid passage HC is increased from "0".

Since the first and second pressure adjusting valves UB and UC are arranged in series with respect to the pressure adjusting fluid passage HC, the second adjusted liquid pressure Pc adjusted by the second pressure adjusting valve UC is less than or equal to the first adjusted liquid pressure Pb. In other words, the second pressure adjusting valve UC adjusts the second adjusted liquid pressure Pc to increase from "0 (atmospheric pressure)", and the first pressure adjusting pressure valve UB adjusts the first adjusted liquid pressure Pb to increase from the second adjusted liquid pressure Pc. In the pressure adjustment unit YC, the first and second adjusted liquid pressure sensors PB, PC are provided on the pressure adjusting fluid passage HC so as to detect the first and second adjusted liquid pressures Pb and Pc.

The pressure adjusting fluid passage HC is branched to the rear wheel pressure adjusting fluid passage HR at a portion Bh between the fluid pump QC and the first pressure adjusting valve UB. The rear wheel pressure adjusting fluid passage HR is connected to the rear wheel cylinder CWr (CWk, CWl) through the lower fluid unit YL. Therefore, the first adjusted liquid pressure Pb adjusted by the first pressure adjusting valve UB is directly introduced (supplied) to the rear wheel cylinder CWr. Furthermore, the pressure adjusting fluid passage HC is branched to the front wheel pressure adjusting fluid passage HF at a portion Bg between the first pressure adjusting valve UB and the second pressure adjusting valve UC. The front wheel pressure adjusting fluid passage HF is connected to the servo chamber Rs. Therefore, the second adjusted liquid pressure Pc adjusted by the second pressure adjusting valve UC is introduced (supplied) to the servo chamber Rs. Since the master cylinder CM is connected to the front wheel cylinder CWf (CWi, CWj) through the lower fluid unit YL, the second adjusted liquid pressure Pc is indirectly introduced to the front wheel cylinder CWf through the master cylinder CM. That is, the second adjusted liquid pressure Pc is supplied to the front wheel cylinder CWf in the order of "Rs→Rm→CWf". The pressure adjustment unit YC is configured to include two pressure adjusting solenoid valves UB and UC, where the first pressure adjusting valve UB adjusts the brake fluid BF discharged from the electric pump DC to the first adjusted liquid pressure Pb, which first adjusted liquid pressure Pb is introduced into the rear wheel cylinder CWr. Then, the second pressure adjusting valve UC adjusts the first adjusted liquid pressure Pb to decrease to the second adjusted liquid pressure Pc, which second adjusted liquid pressure Pc is introduced into the servo chamber Rs.

The pressure adjustment unit YC is provided with a bypass fluid passage HD that connects the reservoir RV and the servo chamber Rs in parallel with the pressure adjusting fluid passage HC. The check valve GD is interposed in the fluid passage HD. The check valve GD allows the flow of the brake fluid BF from the reservoir RV to the servo chamber Rs, but inhibits the flow from the servo chamber Rs to the reservoir RV. When the braking operation member BP is suddenly operated, the master piston PM can also be moved in the advancing direction Ha by the operation force of the driver, and the volume of the servo chamber Rs can be increased. In this case, the liquid amount worth increase in volume of the servo chamber Rs caused by the driver's operation is supplied through the bypass fluid passage HD and the check valve GD. Since the amount of brake fluid BF supplied by the electric pump DC is efficiently used for increasing the braking liquid pressure Pw, the pressure-increase responsiveness at the time of sudden braking can be improved.

Regenerative Coordination Unit YK

The regenerative coordination unit YK achieves coordination control of friction braking and regenerative braking (referred to as "regenerative coordination control"). That is, a state can be formed in which the braking operation member BP is operated but the braking liquid pressure Pw is not generated by the regenerative coordination unit YK. The regenerative coordination unit YK includes an input cylinder CN, an input piston PK, an input elastic body SN, a first open/close valve VA, a second open/close valve VB, a stroke simulator SS, a simulator liquid pressure sensor PS, and an input liquid pressure sensor PN.

The input cylinder CN is a cylinder member having a bottom portion fixed to the master cylinder CM. The input piston PK is a piston member inserted inside the input cylinder CN. The input piston PK is mechanically connected to the braking operation member BP through a clevis (U-shaped link) so as to cooperatively operate with the braking operation member BP. The input piston PK is provided with a flange portion (flange) Tn. An input elastic body (e.g., compression spring) SN is provided between the mounting surface Ma of the input cylinder CN to the master cylinder CM and the flange portion Tn of the input piston PK. The input elastic body SN presses the flange portion Tn of the input piston PK against the bottom portion Mb of the input cylinder CN in the direction of the center axis Jm.

At the time of non-braking, the stepped portion My of the master piston PM is abutted against the second bottom portion Mt of the master cylinder CM, and the flange portion Tn of the input piston PK is abutted against the bottom portion Mb of the input cylinder CN. At the time of non-braking, a gap Ks between the master piston PM (particularly, the end face Mq) and the input piston PK (particularly, the end face Mg) is set to a predetermined distance ks (referred to as an "initial gap") inside the input cylinder CN. That is, when the pistons PM and PK are at the positions in the most retreating direction Hb (referred to as "initial positions" of the respective pistons) (i.e., at the time of non-braking), the master piston PM and the input piston PK are separated by a predetermined distance ks. Here, the predetermined distance ks corresponds to the maximum value of a regeneration amount Rg. When the regenerative coordination control is executed, the gap (also referred to as "separation displacement") Ks is controlled (adjusted) by the adjusted liquid pressure Pc.

When the braking operation member BP is stepped on from the state of "Ba=0", the input piston PK is moved in the advancing direction Ha from its initial position. At this time, if the second adjusted liquid pressure Pc remains at "0", the master piston PM remains at the initial position, and thus the gap Ks (the distance between the end face Mg of the input piston PK and the end face Mq of the master piston PM) gradually decreases as the input piston PK advances. On the other hand, when the second adjusted liquid pressure Pc is increased from "0", the master piston PM is moved in the advancing direction Ha from its initial position. Therefore, the gap Ks can be adjusted independently of the braking operation amount Ba within the range of "0≤Ks≤ks" by the second adjusted liquid pressure Pc. That is, the gap Ks is adjusted by adjusting the second adjusted liquid pressure Pc, and regenerative coordination control is achieved.

The input cylinder CN is connected to the reservoir RV (particularly, the pressure adjusting reservoir chamber Rd) through the second reservoir fluid passage HT. A part of the second reservoir fluid passage HT can be shared with the first reservoir fluid passage HV. However, the first reservoir fluid passage HV and the second reservoir fluid passage HT are desirably separately connected to the reservoir RV. The fluid pump QC suctions the brake fluid BF from the reservoir RV through the first reservoir fluid passage but at this time, air bubbles may be mixed in the first reservoir fluid passage HV. Thus, the second reservoir fluid passage HT does not have a common portion with the first reservoir fluid passage HV and is connected to the reservoir RV separately from the first reservoir fluid passage HV so as to avoid air bubbles from being mixed into the input cylinder CN and the like.

In the second reservoir fluid passage HT, two open/close valves VA and VB are provided in series. The first and second open/close valves VA and VB are two-position solenoid valves (also referred to as "on/off valves") having an open position (communicated state) and a closed position (shut-off state). The first and second open/close valves VA and VB are controlled by the upper controller ECU based on the drive signals Va, Vb. A normally-closed type solenoid valve is employed as the first open/close valve VA, and a normally-open type solenoid valve is employed as the second open/close valve VB.

The second reservoir fluid passage HT is connected to the simulator fluid passage HS at a connecting portion Bs between the first open/close valve VA and the second open/close valve VB. In other words, one end of the simulator fluid passage HS is connected to the rear chamber Ro, and the other end is connected to the portion Bs. The stroke simulator SS is provided in the simulator fluid passage HS. When the regenerative coordination control is executed by the simulator SS, and the first open/close valve VA is at the open position and the second open/close valve VB is at the closed position, the operation force Fp of the braking operation member BP is generated. A piston and an elastic body (e.g., compression spring) are provided inside the simulator SS. The brake fluid BF is moved from the input cylinder CN to the simulator SS, and the piston is pushed by the inflowing brake fluid BF. A force is applied to the piston in a direction of inhibiting the inflow of the brake fluid BF by the elastic body. The elastic body forms an operation force Fp when the braking operation member BP is operated.

The simulator liquid pressure sensor PS is provided in the simulator fluid passage HS so as to detect a liquid pressure (simulator liquid pressure) Ps in the simulator SS. In addition, the input liquid pressure sensor PN is provided so as to detect the liquid pressure (liquid pressure of the input chamber Rn, referred to as "input liquid pressure") Pn between the first open/close valve VA of the second reservoir fluid passage HT and the input chamber Rn. The simulator liquid pressure sensor PS and the input liquid pressure sensor PN are one of the braking operation amount sensors BA described above. The detected liquid pressures Ps, Pn are input to the upper controller ECU as the braking operation amount Ba.

Upper Controller ECU

The electric motor MC and the solenoid valves VA, VB, UB and UC are controlled based on the braking operation amount Ba, the operation signal St, and the first and second adjusted liquid pressures (detected values) Pb, Pc by the upper controller ECU. Specifically, the upper controller ECU calculates drive signals Va, Vb, Ub, Uc for controlling the various solenoid valves VA, VB, UB, UC. Similarly, the drive signal Mc for controlling the electric motor MC is calculated. The solenoid valves VA, VB, UB, UC and the electric motor MC are driven based on these drive signals Va, Vb, Ua, Ub, Mc.

The upper controller (electronic control unit) ECU is network-connected to the lower controller ECL and the controllers of other systems (drive controller ECD, driving assistance controller ECJ, etc.) through an in-vehicle communication bus BS. The regeneration amount (target value) Rg is transmitted from the upper controller ECU to the drive controller ECD through the communication bus BS so as to execute regenerative coordination control. Furthermore, the required deceleration (target value) Gd is transmitted from the driving assistance controller ECJ to the upper controller ECU through the communication bus BS.

Lower Fluid Unit YL

The lower fluid unit YL is a known fluid unit including a master liquid pressure sensor PQ, a plurality of solenoid valves, an electric pump, and a low pressure reservoir. The lower fluid unit YL is controlled by the lower controller ECL. A wheel speed Vw, a yaw rate, a steering angle, a longitudinal acceleration, a lateral acceleration, and the like are input to the lower controller ECL. The lower controller ECL calculates a vehicle body speed Vx based on the wheel speed Vw. Anti-skid control is executed based on the vehicle body speed Vx and the wheel speed Vw so as to suppress excessive deceleration slip of the wheel WH (e.g., wheel lock). In the lower controller ECL, vehicle stabilization control (so-called ESC) for suppressing unstable behavior (excessive oversteer behavior, understeer behavior) of the vehicle is executed based on the yaw rate. That is, the braking liquid pressure Pw of each wheel WH is individually controlled by the lower fluid unit YL. The calculated vehicle body speed Vx is input to the upper controller ECU through the communication bus BS.

Operation of Braking Control Device SC

At the time of non-braking (e.g., when the operation of the braking operation member BP is not performed), the solenoid valves VA, VB, UB, and UC are not energized. Therefore, the first open/close valve VA is at the closed position, and the second open/close valve VB is at the open position. At this time, the pistons PM and PN are pressed to their initial positions by the elastic bodies SM and SN, the master cylinder CM and the reservoir RV are in a communicated state, and the master liquid pressure Pm is "0 (atmospheric pressure)".

When the braking operation member BP is operated (particularly at the start of control braking), the input chamber Rn and the rear chamber Ro are connected and the simulator SS is connected to the input chamber Rn by the open position of the first open/close valve VA. Furthermore, the connection between the simulator SS and the reservoir RV is shut off by the closed position of the second open/close valve VB. The input piston PK is moved in the advancing direction Ha by the operation of the braking operation member BP, which movement causes the liquid amount flowing out from the input chamber Rn to flow into the simulator SS, thus forming the operation force Fp of the braking operation member BP.

When the vehicle deceleration is sufficient with the regenerative braking force Fg generated by the generator GN, the state of "Pb=Pc=0" is maintained. The input piston PK is moved from its initial position in the advancing direction Ha by operating the braking operation member BP, but at this time, the second adjusted liquid pressure Pc remains "0", and hence the master piston PM is not moved. Therefore, the gap Ks (the distance between the end face Mg of the input piston PK and the end face Mq of the master piston PM) gradually decreases as the input piston PK advances.

When the vehicle deceleration is insufficient with the regenerative braking force Fg generated by the generator GN, the controller ECU controls the pressure adjustment unit YC, and the first and second adjusted liquid pressures Pb and Pc are adjusted. The first adjusted liquid pressure Pb is directly applied to the rear wheel cylinder CWr through the rear wheel pressure adjusting fluid passage HR and the lower fluid unit YL. The second adjusted liquid pressure Pc is applied to the servo chamber Rs through the front wheel pressure adjusting fluid passage HF. When the force (forward force) Fa in the advancing direction Ha generated by the liquid pressure (servo liquid pressure) Pv (=Pc) in the servo chamber Rs becomes larger than the set load of the master elastic body SM, the master piston PM is moved along the center axis Jm. This movement in the advancing direction Ha shuts off the master chamber Rm from the reservoir RV. Furthermore, when the second adjusted liquid pressure Pc is increased, the brake fluid BF is sent from the master cylinder CM toward the front wheel cylinder CWf at the master liquid pressure Pm. A force (reverse force) Fb in the retreating direction Hb acts on the master piston PM by the master liquid pressure Pm. The servo chamber Rs generates a force (forward force) Fa in the advancing direction Ha by the second adjusted liquid pressure Pc so as to oppose (oppose) the reverse force Fb. The master liquid pressure Pm is thus increased or decreased according to the increase or decrease of the adjusted liquid pressure Pc. The master piston PM is moved from the initial position in the advancing direction Ha as the second adjusted liquid pressure Pc increases, but the gap Ks can be adjusted independently of the braking operation amount Ba within the range of "0≤Ks≤ks" by the second adjusted liquid pressure Pc. That is, the regenerative coordination control is executed by the adjustment of the gap Ks by the second adjusted liquid pressure Pc.

When the braking operation member BP is returned, the second adjusted liquid pressure Pc is reduced by the pressure adjustment unit YC. Then, when the servo liquid pressure Pv (=Pc) becomes smaller than the master chamber liquid pressure Pm (=Pwf), the master piston PM is moved in the retreating direction Hb. When the braking operation member BP is in the non-operated state, the elastic force of the compression spring SM causes the master piston PM (particularly, the stepped portion My) to return to the position (initial position) where it comes into contact with the second bottom portion Mt of the master cylinder CM.

At the time of manual braking, the first and second open/close valves VA and VB are not energized. Therefore, the first open/close valve VA is at the closed position, and the second open/close valve VB is at the open position. The input chamber Rn is in a fluid locked state (sealed state) by the closed position of the first open/close valve VA, so that the input piston PK and the master piston PM cannot be relatively moved. Moreover, the rear chamber Ro is fluidly connected to the reservoir RV through the second reservoir fluid passage HT by the open position of the second open/close valve VB. Therefore, the volume of the rear chamber Ro is reduced by the movement of the master piston PM in the advancing direction Ha, but the liquid amount accompanying the volume reduction is discharged toward the reservoir RV. In conjunction with the operation of the braking operation member BP, the input piston PK and the master piston PM are integrally moved and the brake fluid BF is sent from the master chamber Rm to the front wheel cylinder CWf.

Pressure Adjusting Control Process

Figure 2:
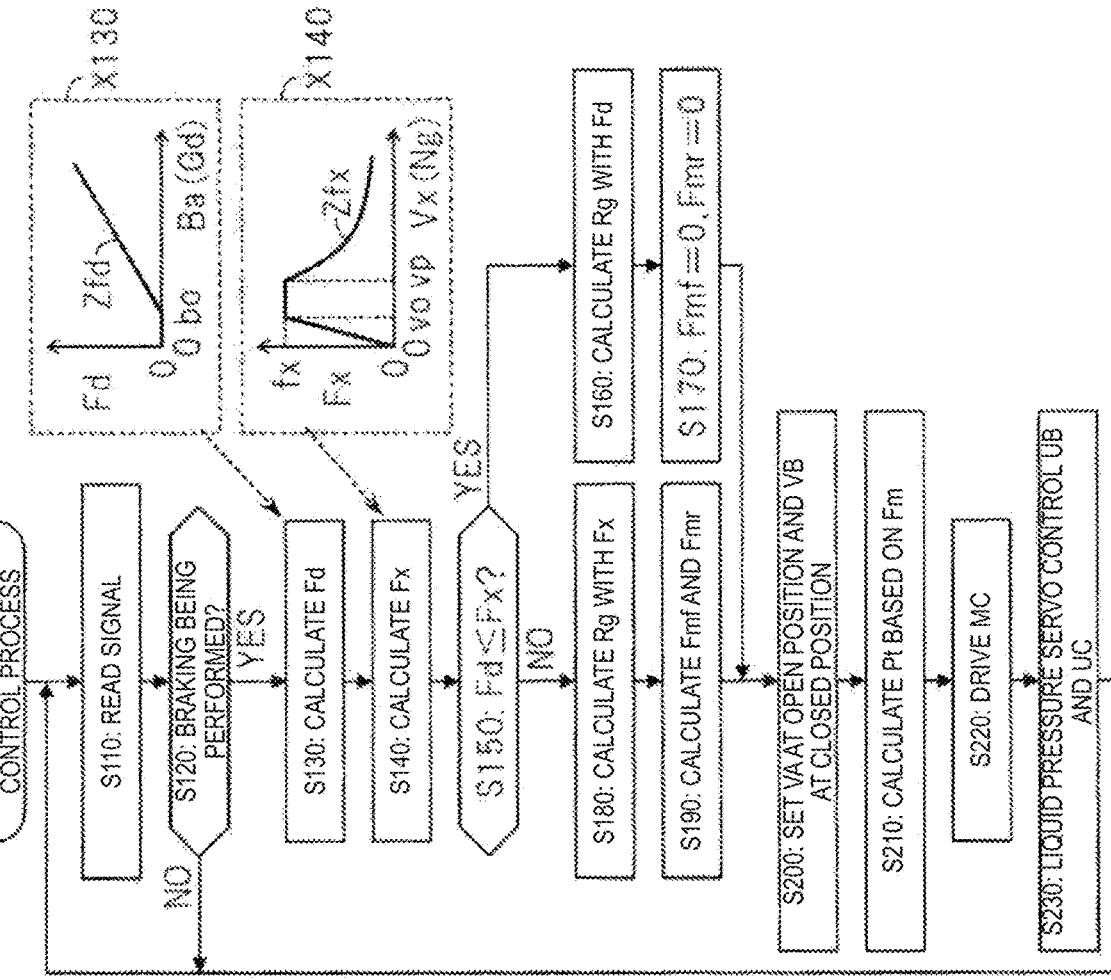
FIG. 2 is a control flowchart for describing a process of pressure adjusting control including regenerative coordination control.

With reference to the control flowchart of FIG. 2, the process of pressure adjusting control including regenerative coordination control will be described. The "pressure adjusting control" is a drive control of the electric motor MC and the first and second pressure adjusting valves UB and UC for adjusting the first and second adjusted liquid pressures Pb and Pc. The control algorithm is programmed in the upper controller ECU.

In step S110, the braking operation amount Ba, the operation signal St, the first and second adjusted liquid pressures (detected values) Pb and Pc, the required deceleration Gd, and the vehicle body speed Vx are read. The operation amount Ba is detected by the operation amount sensor BA (e.g., operation displacement sensor SP, input liquid pressure sensor PN, simulator liquid pressure sensor PS, etc.). The operation signal St is detected by the operation switch ST. The first and second adjusted liquid pressures Pb and Pc are detected by the first and second adjusted liquid pressure sensors PB and PC provided in the pressure adjusting fluid passage HC. The required deceleration Gd by automatic braking is acquired from the driving assistance controller ECJ through the communication bus BS. The vehicle body speed Vx is acquired from the lower controller ECL through the communication bus BS. The vehicle body speed Vx may be calculated by the upper controller ECU based on the wheel speed Vw when the wheel speed Vw is input to the upper controller ECU.

In step S120, "whether or not braking is being performed" is determined based on at least one of the braking operation amount Ba and the braking operation signal St. For example, when the operation amount Ba is greater than a predetermined value bo, positive determination is made in step S120 and the process proceeds to step S130. On the other hand, when the braking operation amount Ba is less than or equal to the predetermined value bo, negative determination is made in step S120 and the process returns to step S110. Here, the predetermined value bo is a constant set in advance that corresponds to the play of the braking operation member BP. When the operation signal St is on, the process proceeds to step S130, and when the operation signal St is off, the process returns to step S110.

At the time of automatic braking, in step S120, "whether or not braking is being performed" is determined based on the required deceleration Gd. For example, when the required deceleration Gd is greater than a predetermined value go, positive determination is made in step S120, and the process proceeds to step S130. On the other hand, when the required deceleration Gd is less than or equal to the predetermined value go, negative determination is made in step S120 and the process returns to step S110. The predetermined value go is a preset constant (e.g., "0").

In step S130, as shown in block X130, the required braking force Fd is calculated based on the operation amount Ba. The required braking force Fd is a target value of the total braking force F that acts on the vehicle, and is a braking force obtained by combining the "friction braking force Fm by the braking control device SC" and the "regenerative braking force Fg by the generator GN". According to the calculation map Zfd, the required braking force Fd is determined to be "0" when the operation amount Ba is in the range from "0" to the predetermined value bo, and is calculated to monotonically increase from "0" as the operation amount Ba increases when the operation amount Ba is greater than or equal to the predetermined value bo. Similarly, at the time of automatic braking, the required braking force Fd is calculated based on the required deceleration Gd. The required braking force Fd is determined to be "0" when the required deceleration Gd is greater than or equal to "0" and less than the predetermined value go, and is determined to monotonically increase from "0" as the required deceleration Gd increases when the required deceleration Gd is greater than or equal to the predetermined value bo.

In step S140, as shown in block X140, the maximum value of the regenerative braking force (referred to as "maximum regenerative force") Fx is calculated based on the vehicle body speed Vx and the calculation map Zfx. The regeneration amount of the generator GN is limited by the rating of the power transistor (IGBT etc.) of the drive controller ECD and the charge acceptability of the battery. For example, the regeneration amount of the generator GN is controlled to a predetermined electric power (electric energy per unit time). Since the electric power (power) is constant, the regenerative torque around the wheel shaft by the generator GN is inversely proportional to the rotation number of the wheel WH (i.e., the vehicle body speed Vx). Furthermore, when the rotation number Ng of the generator GN decreases, the regeneration amount decreases. In addition, an upper limit value is set for the regeneration amount.

From the above, in the calculation map Zfx for the maximum regenerative force Fx, in the range where the vehicle body speed Vx is higher than or equal to "0" or lower than a first predetermined speed vo, the maximum regenerative force Fx is set to increase as the vehicle body speed Vx increases. Furthermore, in the range where the vehicle body speed Vx is higher than or equal to the first predetermined speed vo and lower than the second predetermined speed vp, the maximum regenerative force Fx is determined to be the upper limit value fx. Then, when the vehicle body speed Vx is higher than or equal to a second predetermined speed vp, the maximum regenerative force Fx is set to decrease as the vehicle body speed Vx increases. For example, in the decreasing characteristic of the maximum regenerative force Fx (characteristic of "Vx≥vp"), the relationship between the vehicle body speed Vx and the maximum regenerative force Fx is represented by a hyperbola (i.e., regenerative power is constant). Here, the respective predetermined values vo and vp are preset constants. In the calculation map Zfx, the rotation number Ng of the generator GN can be adopted instead of the vehicle body speed Vx.

In step S150, "whether or not the required braking force Fd is less than or equal to the maximum regenerative force Fx" is determined based on the required braking force Fd and the maximum regenerative force Fx. That is, whether or not the braking force Fd required by the driver can be achieved only by the regenerative braking force Fg is determined. When "Fd≤Fx" and positive determination is made in step S150, the process proceeds to step S160. On the other hand, when "Fd>Fx" and negative determination is made in step S150, the process proceeds to step S180.

In step S160, the regeneration amount Rg is calculated based on the required braking force Fd. The regeneration amount Rg is a target value of the regeneration amount of the generator GN. The regeneration amount Rg is transmitted from the braking controller ECU to the drive controller ECD through the communication bus BS. In step S170, the target friction braking forces Fmf and Fmr for the front and rear wheels are calculated to be "0". In this case, the vehicle deceleration does not employ friction braking, and the required braking force Fd is achieved only by the regenerative braking.

In step S180, the regeneration amount (target value) Rg is calculated based on the maximum regenerative force Fx. Similar to step S160, the regeneration amount Rg is transmitted to the drive controller ECD through the communication bus BS. In this case, the generator GN produces the maximum regenerative braking force that can be generated. In step S190, the front wheel and rear wheel friction braking forces Fmf and Fmr are determined based on the required braking force Fd and the maximum regenerative force Fx. The front wheel and rear wheel friction braking forces Fmf and Fmr are target values of the braking force to be achieved by friction braking.

In step S190, first, the required braking force Fd is multiplied by the rear wheel ratio Hr to calculate the rear wheel reference force Fs (i.e., "Fs=Hr×Fd"). The rear wheel ratio Hr is a predetermined value set in advance that represents the distribution ratio between the front and rear wheels (in particular, the ratio of the rear wheel braking force Fr with respect to the total braking force F that acts on the vehicle). Therefore, the rear wheel reference force Fs is a value that takes into consideration the braking force distribution between the front and rear wheels with respect to the required braking force Fd. Furthermore, the maximum regenerative force Fx is subtracted from the required braking force Fd to calculate a complementary braking force Fh (i.e., "Fh=Fd−Fx"). The complementary braking force Fh is a braking force to be complemented by friction braking in order to achieve the required braking force Fd. Then, the complementary braking force Fh and the rear wheel reference force Fs are compared. When the complementary braking force Fh is less than or equal to the rear wheel reference force Fs, the front wheel friction braking force Fmf is determined to be "0" and the rear wheel friction braking force Fmr is determined to be the complementary braking force Fh (i.e., "Fmf=0, Fmr=Fh"). On the other hand, when the complementary braking force Fh is greater than the rear wheel reference force Fs, the rear wheel friction braking force Fmr is calculated to be the rear wheel reference force Fs, and the front wheel friction braking force Fmf is calculated to be a value obtained by subtracting the rear wheel reference force Fs from the complementary braking force Fh (i.e., "Fmf=Fc=Fh−Fs, Fmr=Fs=Hr×Fd").

In step S190, the front wheel and rear wheel friction braking forces Fmf and Fmr are calculated in consideration of the front-rear distribution of the braking force F including the regenerative braking force Fg. When the required braking force Fd can be achieved by the regenerative braking force Fg and the rear wheel reference force Fs (rear wheel braking force taking into consideration the front-rear distribution) (i.e., in the case of "Fh≤Fs"), the front wheel friction braking force Fmf is maintained at "0", and only the regenerative braking force Fg (=Fx) is applied on the front wheel WHf. In the rear wheel WHr, the rear wheel friction braking force Fmr is determined and added so as to satisfy the required braking force Fd. On the other hand, when the required braking force Fd cannot be achieved by the regenerative braking force Fg and the rear wheel reference force Fs (i.e., when "Fh>Fs"), the front wheel friction braking force Fmf is determined to satisfy the shortfall. As a result, the regeneration amount Rg can be maximized and the front-rear distribution of the braking force F can be optimized.

In step S200, the first open/close valve VA is driven to the open position and the second open/close valve VB is driven to the closed position. In step S210, the target liquid pressure Pt (Ptf, Ptr) is calculated based on the target value Fm (Fmf, Fmr) of the friction braking force. That is, the friction braking force Fm is converted into a liquid pressure, and the target liquid pressure Pt is determined. The rear wheel target liquid pressure Ptr is a target value of the liquid pressure of the rear wheel cylinder CWr corresponding to the first adjusted liquid pressure Pb. The front wheel target liquid pressure Ptf is a target value of the liquid pressure of the front wheel cylinder CWf corresponding to the second adjusted liquid pressure Pc.

In step S220, the electric motor MC is driven and the reflux of the brake fluid BF including the fluid pump QC is formed. The electric motor MC (electric pump DC) is driven (rotated) even if "Ptf=Ptr=0" in order to ensure pressure-increase responsiveness. Then, in step S230, the first pressure adjusting valve UB is servo-controlled so that the first adjusted liquid pressure Pb matches the rear wheel target liquid pressure Ptr based on the rear wheel target liquid pressure Ptr and the first adjusted liquid pressure Pb (detected value of the first adjusted liquid pressure sensor PB). Furthermore, the second pressure adjusting valve UC is servo-controlled so that the second adjusted liquid pressure Pc matches the front wheel target liquid pressure Ptf based on the front wheel target liquid pressure Ptf and the second adjusted liquid pressure Pc (detected value of the second adjusted liquid pressure sensor PC). In servo control, feedback control is performed so that the actual values Pb and Pc match the target value Pt.

The first and second pressure adjusting valves UB and UC are arranged in series in the pressure adjusting fluid passage HC. Therefore, in the liquid pressure feedback control of the first and second adjusted liquid pressures Pb and Pc, they may influence each other and so-called control interference may occur. In such a case, the control of the second adjusted liquid pressure Pc related to the front wheels WHf is prioritized over the control of the first adjusted liquid pressure Pb related to the rear wheels WHr. The front wheel braking force Ff is based on the fact that its contribution degree with respect to the total braking force F is higher than the rear wheel braking force Fr.

Figure 3:
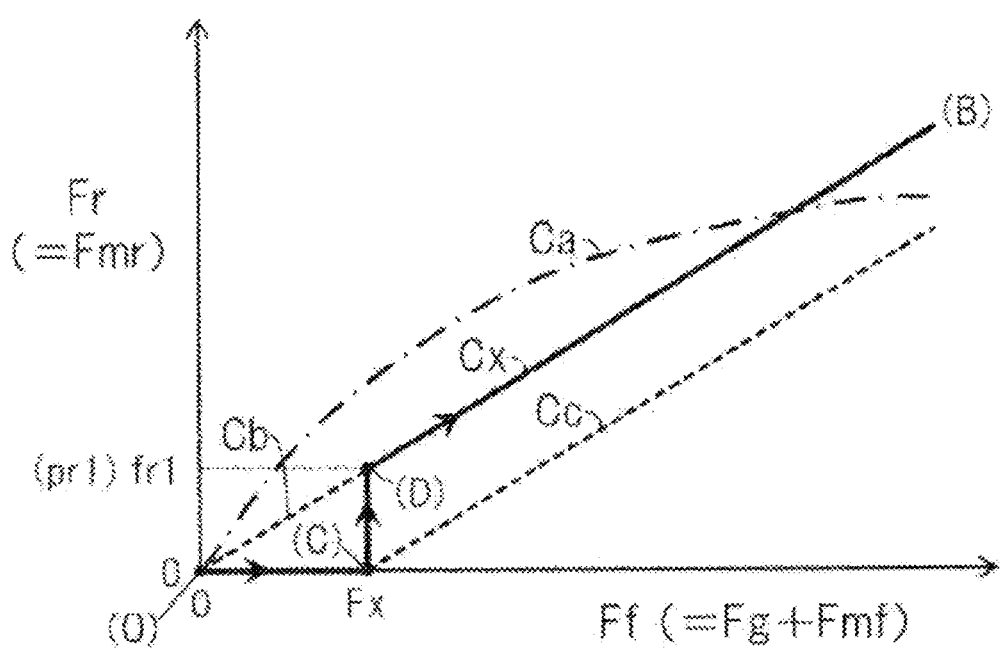
FIG. 3 is a characteristic diagram for explaining a transition of the braking force F in the first embodiment.

Transition of Front-Rear Distribution of Braking Force in the First Embodiment The front-rear distribution of the braking force F in the regenerative coordination control in the first embodiment will be described with reference to a characteristic diagram of FIG. 3. Here, the regenerative generator GN is provided on the front wheel WHf, and the regenerative braking force Fg acts on the front wheel WHf in addition to the friction braking force Fmf. Since the generator GN is not provided on the rear wheel WHr, no regenerative braking force acts on the rear wheel WHr, and only the friction braking force Fmr acts on the rear wheel.

A characteristic Ca indicated by a chain dashed line represents a so-called ideal braking force distribution in which variation in the ground load (vertical force) of the front and rear wheels WHf, WHr involved in the vehicle deceleration is considered. In the ideal distribution characteristic Ca, the braking forces Ff and Fr of the front and rear wheels WHf, WHr are proportional to the dynamic ground load that takes into consideration the vehicle deceleration Gx. Therefore, in the ideal distribution characteristic Ca, when anti-skid control is not executed, the front wheels WHf and the rear wheels WHr are simultaneously wheel-locked on a road surface of any friction coefficient, and the braking force F (=Ff+Fr) becomes a maximum on such road surface.

A characteristic Cb (characteristics (O)-(B)) represents a correlation between the front wheel braking force Ff and the rear wheel braking force Fr when the regenerative braking force Fgf does not act (i.e., "Fg=0"). The characteristic Cb is called "reference characteristic". The reference characteristic Cb is based on "the pressure receiving area of the front and rear wheel cylinders CWf and CWr", "the effective braking radius of the rotating members KTf and KTr", and "the friction coefficient of the friction material of the front and rear wheels". Here, the slope of the reference characteristic Cb (i.e., "Fr/Ff") is "Hr/Hf=Hr/(1−Hr)". Here, the front wheel ratio Hf is the ratio (=Ff/F) of the front wheel braking force Ff with respect to the total braking force F (=Ff+Fr), and the rear wheel ratio Hr is the ratio (=Fr/F) of the rear wheel braking force Fr with respect to the total braking force F.

In a typical vehicle, the pressure receiving area of the wheel cylinder CW, the effective braking radius of the rotating member KT, and the friction coefficient of the friction material are set such that the reference characteristic Cb becomes smaller than the ideal distribution characteristic Ca within a range of normal braking (within region excluding region where maximum braking force is generated) so that the rear wheel WHr is not wheel-locked preceding the front wheel WHf. In the region where the maximum braking force is generated, the braking force distribution control (so-called EBD control) is executed based on the wheel speed Vw so that the deceleration slip of the rear wheel WHr does not become greater than the deceleration slip of the front wheel WHf.

In the characteristic diagram, the origin (O) corresponds to a time of non-braking (i.e., "Ff=Fr=0"). When the operation of the braking operation member BP is started, "Fmf≤Fmr=0" is determined because "Fd≤Fx" at the initial stage of braking, and the friction braking forces Fmf and Fmr are not generated. That is, "Ptf=Ptr=0 (result, Pc=Pb=0)" is calculated, and the braking force F is generated only by the regenerative braking force Fg. This state is maintained until the required braking force Fd reaches the maximum regenerative force Fx, and thus the operating point of the braking force F is moved from the origin (O) toward point (C) (point of "Ff=Fx, Fr=0").

When the operation amount Ba of the braking operation member BP is increased and the regenerative braking force Fg has reached the maximum regenerative force Fx, the required braking force Fd cannot be achieved only by the regenerative braking force Fg. In this case, the front wheel and rear wheel friction braking forces Fmf and Fmr (target values of friction braking force) are calculated based on the required braking force Fd and the maximum regenerative force Fx. Specifically, the rear wheel reference force Fs is calculated by "Fs=Hr×Fd" and the complementary braking force Fh is calculated by "Fh=Fd−Fx". When "Fh≤Fs", "Fmf=0, Fmr=Fh" is calculated. When the required braking force Fd can be achieved by the regenerative braking force Fg and the rear wheel reference force Fs, only the regenerative braking force Fg (=Fx) acts on the front wheels WHf and the rear wheel friction braking force Fmr is determined so as to satisfy the required braking force Fd. At this time, the maximum regenerative force Fx increases with a characteristic of "downwardly convex" as the vehicle body speed Vx decreases (see FIG. 2). Since the increase in regenerative braking force Fg (=Fx) is little with respect to the increase in rear wheel friction braking force Fmr, the operating point of the braking force F transitions substantially parallel to the Y-axis from point (C) ("Ff=Fx, Fr=fr1"). toward point (D).

Furthermore, when the braking operation amount Ba is increased and the complementary braking force Fh cannot be achieved only by the rear wheel reference force Fs (i.e., the state of "Fh>Fs"), the front wheel friction braking force Fmf is increased from "0" according to the front wheel instruction force Fc. That is, when the required braking force Fd cannot be achieved by the regenerative braking force Fg and the rear wheel reference force Fs, the front wheel friction braking force Fmf is determined so as to satisfy the shortfall. The front wheel and rear wheel friction braking forces Fmf and Fmr are calculated by "Fmr=Fs, Fmf=Fh−Fs=Fc" in consideration of the front-rear distribution Hr of the braking force F including the regenerative braking force Fg. Therefore, the operating point of the braking force F transitions from point (D) to point (B) slang the characteristic Cb. As described above, the braking force distribution characteristic Cx (transition of the operating point of the braking force F) according to the first embodiment becomes "(O)→(C)→(D)→(B)" as the braking operation amount Ba increases.

In the braking control device SC, the front wheel target liquid pressure Ptf is calculated based on the front wheel friction braking force (target value) Fmf. Based on the front wheel target liquid pressure Ptf, the second adjusted liquid pressure Pc is adjusted by the second pressure adjusting valve UC, and ultimately, the front wheel braking liquid pressure Pwf is controlled. Furthermore, the rear wheel target liquid pressure Ptr is calculated based on the rear wheel friction braking force Fmr. Based on the rear wheel target liquid pressure Ptr, the first adjusted liquid pressure Pb is adjusted by the first pressure adjusting valve UB, and ultimately, the rear wheel braking liquid pressure Pwr is controlled. When the braking operation is started, until the regenerative braking force Fg reaches the maximum regenerative force Fx (point O to point C), it is controlled to "Pb=Pc=0" based on "Ptf=Ptr=0" (that is, the electric pump DC is driven, but the first and second pressure adjusting valves UB and UC are in a fully open state). Then, at a time point the regenerative braking force Fg reaches the maximum regenerative force Fx, the front wheel target liquid pressure Ptf is maintained at "0" and the rear wheel target liquid pressure Ptr is increased. As a result, the increase of the first adjusted liquid pressure Pb is started and the rear wheel braking liquid pressure Pwr is increased (i.e., the second pressure adjusting valve UC is in a fully open state) with "Pc=0". Furthermore, at a time point the complementary braking force Fh exceeds the rear wheel reference force Fs (corresponds to point D, time point when the rear wheel braking liquid pressure Pwr reaches the liquid pressure pr1 corresponding to the predetermined braking force fr1), the front wheel target liquid pressure Ptf is increased from "0". As a result, the increase of the second adjusted liquid pressure Pc (i.e., the front wheel braking liquid pressure Pwf) is started. Thereafter, while taking into consideration the front-rear ratio (e.g., the rear wheel ratio Hr) so that the operating point of the braking force F lies along the reference characteristic Cb, the front wheel and rear wheel target liquid pressures Ptf, Ptr are increased, and the first and second adjusted liquid pressures Pb and Pc are increased.

For example, in the configuration in which the same liquid pressure is always introduced to all of the wheel cylinders CW (that is, when the first adjusted liquid pressure Pb and the second adjusted liquid pressure Pc are the same), the braking force distribution in the regenerative coordination control changes like the characteristic Cc. The rear wheel braking force Fr in the characteristic Cc is small compared to the rear wheel braking force Fr of the ideal distribution characteristic Ca. For this reason, in the characteristic Cc, the vehicle stability is ensured, but the rear wheel braking force Fr cannot be fully utilized. In the braking control device SC according to the present invention, in consideration of the predetermined rear wheel ratio Hr, the front wheel and rear wheel friction braking forces (target values) Fmf, Fmr are calculated, and the adjusted liquid pressures Pc, Pb (that is, the braking liquid pressures Pwf, Pwr) are separately adjusted independently of the braking operation (or braking request) so as to achieve the same. Due to the obtained distribution characteristic Cx, the regeneration amount Rg of the generator GN can be maximized and the front-rear distribution of the braking force F can be optimized. That is, the braking forces Ff and Fr of the front and rear wheels are thus suitably ensured, and the vehicle stability is maintained and the regeneratable energy amount can be sufficiently ensured.

Second Embodiment of Braking Control Device for Vehicle According to the Present Invention A second embodiment of the braking control device SC according to the present invention will be described with reference to an overall configuration view of FIG. 4. In the first embodiment described with reference to FIG. 1, the generator GN is provided on the front wheel WHf. In the second embodiment, the generator GN is provided on the rear wheel WHr.

Similar to the first embodiment, also in the second embodiment, configuring members, calculation processes, signals, characteristics, and values having the same symbol have the same functions. The suffixes "i" to "l" at the end of the symbols are comprehensive symbols indicating which wheel is related, where "i" is the right front wheel, "j" is the left front wheel, "k" is the right rear wheel, and "l" is the left rear wheel. When the subscripts "i" to "l" are omitted, each symbol represents a generic name of each of the four wheels. The suffixes "f" and "r" at the end of the symbols are comprehensive symbols indicating which system of the front and rear wheels is related to in the fluid passages of two systems (the movement path of the brake fluid BF), where "f" Indicates a front wheel system, and "r" indicates a rear wheel system. If the suffixes "f" and "r" are omitted, they represent the generic name of the two systems. In each fluid passage, "upstream side (or upper part)" is a side closer to the reservoir RV, and "downstream side (or lower part)" is a side closer to the wheel cylinder CW. The differences will be described below.

Similar to the first embodiment, in the second embodiment, in the pressure adjustment unit YC, two pressure adjusting valves UB and UC are provided in series in the pressure adjusting fluid passage HC. Specifically, the first pressure adjusting valve UB and the second pressure adjusting valve UC are arranged in this order along the circulation flow (A) of the brake fluid BF. Then, the second pressure adjusting valve UC adjusts the second adjusted liquid pressure Pc to increase from "0 (atmospheric pressure)", and the first pressure adjusting valve UB adjusts the first adjusted liquid pressure Pb to increase from the second adjusted liquid pressure Pc. Conversely, the first pressure adjusting valve UB adjusts the first adjusted liquid pressure Pb, and the second pressure adjusting valve UC adjusts the second adjusted liquid pressure Pc to decrease from the first adjusted liquid pressure Pb. That is, the first adjusted liquid pressure Pb and the second adjusted liquid pressure Pc are in a relationship of "Pb≥Pc".

In the second embodiment, the gap (separation displacement) Ks is adjusted by adjusting the first adjusted liquid pressure Pb, and regenerative coordination control is achieved. When the braking operation member BP is in a state of "Ba=0", "Ks=ks", but the first adjusted liquid pressure Pb is controlled independently of the braking operation amount Ba, and thus the gap Ks is adjusted in a range of greater than or equal to "0" and less than or equal to an initial gap ks. Therefore, the master liquid pressure Pm (=Pwf) can be adjusted independently of the braking operation amount Ba.

In the second embodiment, the liquid pressure Pwf of the front wheel cylinder CWf and the liquid pressure Pwr of the rear wheel cylinder CWr can be adjusted independently. Then, the liquid pressure Pwr of the rear wheel WHr provided with the generator GN is adjusted to be less than or equal to the braking liquid pressure Pwf of the front wheel WHf not provided with the generator GN. Specifically, the pressure adjusting fluid passage HC is branched to the front wheel pressure adjusting fluid passage HF at a portion Cg between the fluid pump QC and the first pressure adjusting valve UB. The front wheel pressure adjusting fluid passage HF is connected to the servo chamber Rs, and the first adjusted liquid pressure Pb is introduced (supplied) to the servo chamber Rs. Therefore, the first adjusted liquid pressure Pb is indirectly introduced into the front wheel cylinder CWf through the master cylinder CM. That is, the first adjusted liquid pressure Pb is supplied to the front wheel cylinder CWf in the order of "Rs→Rm→CWf". Furthermore, the pressure adjusting fluid passage HC is branched to the rear wheel pressure adjusting fluid passage HR at a portion Cs between the first pressure adjusting valve UB and the second pressure adjusting valve UC. The rear wheel pressure adjusting fluid passage HR is connected to the rear wheel cylinder CWr through the lower fluid unit YL. Therefore, the second adjusted liquid pressure Pc is directly introduced (supplied) to the rear wheel cylinder CWr and adjusted within the range of "0≤Pc≤Pb". The pressure adjustment unit YC is configured to include first and second solenoid valves UB and UC, where the first pressure adjusting valve UB adjusts the brake fluid BF discharged by the electric pump DC to the first adjusted liquid pressure Pb, which first adjusted liquid pressure Pb is introduced into the servo chamber Rs. Then, the second pressure adjusting valve UC adjusts the first adjusted liquid pressure Pb to decrease to the second adjusted liquid pressure Pc, which second adjusted liquid pressure Pc is introduced into the rear wheel cylinder CWr.

Next, the process of pressure adjusting control in the second embodiment will be described. The process of step S190 differs from the process of the first embodiment. In the second embodiment, the required braking force Fd is multiplied by the front wheel ratio Hf to calculate the front wheel reference force Ft (i.e., "Ft=Hf×Fd"). The front wheel ratio Hf is a predetermined value set in advance that represents the distribution ratio of the front wheel braking force Ff with respect to the total braking force that acts on the vehicle. Similar to the rear wheel reference force Fs, the front wheel reference force Ft is a value that takes into consideration the front-rear braking force distribution with respect to the required braking force Fd. The maximum regenerative force Fx is subtracted from the required braking force Fd, and the friction braking force (complementary braking force) Fh necessary for achieving the required braking force Fd is calculated (i.e., "Fh=Fd−Fx"). The complementary braking force Fh and the front wheel reference force Ft are compared, and when the complementary braking force Fh is less than or equal to the front wheel reference force Ft, "Fmf=Fh, Fmr=0" is determined. Moreover, when the complementary braking force Fh is greater than the front wheel reference force Ft, the front wheel reference force Ft is calculated as the front wheel friction braking force Fmf, and the rear wheel friction braking force Fmr is calculated to a value obtained by subtracting the front wheel reference force Ft from the complementary braking force Fh (rear wheel instruction force) Fq (i.e., "Fmf=Ft=Hf×Fd, Fmr=Fq=Fh−Ft").

Similarly, the front wheel and rear wheel friction braking forces Fmf and Fmr are calculated in consideration of the front-rear distribution of the braking force F including the regenerative braking force Fg. When the required braking force Fd can be achieved by the regenerative braking force Fg and the front wheel reference force Ft taking into consideration the front-rear distribution (i.e., when "Fh≤Ft"), "Fmr=0" is set, and only the regenerative braking force Fg (=Fx) acts on the rear wheel WHr. Then, the braking force is complemented by the front wheel friction braking force Fmf so as to satisfy the required braking force Fd. On the other hand, when the required braking force Fd is insufficient with the regenerative braking force Fg and the front wheel reference force Ft (i.e., when "Fh>Ft"), the shortage is supplemented by the rear wheel friction braking force Fmr. The front wheel and rear wheel target liquid pressures Ptf and Ptr are determined based on the front wheel and rear wheel friction braking forces Fmf and Fmr. The first adjusted liquid pressure Pb is adjusted by the first pressure adjusting valve UB based on the front wheel target liquid pressure Ptf. Furthermore, the second adjusted liquid pressure Pc is adjusted by the second pressure adjusting valve UC based on the rear wheel target liquid pressure Ptr. That is, the front wheel and rear wheel braking liquid pressures Pwf and Pwr are individually adjusted independently of the braking operation (or the braking request). As a result, the regeneration amount Rg of the generator GN provided on the rear wheel WHr is maximized, and the front-rear distribution of the braking force F of the entire vehicle can be optimized.

Transition of Front-Rear Distribution of Braking Force in the Second Embodiment

Figure 5:
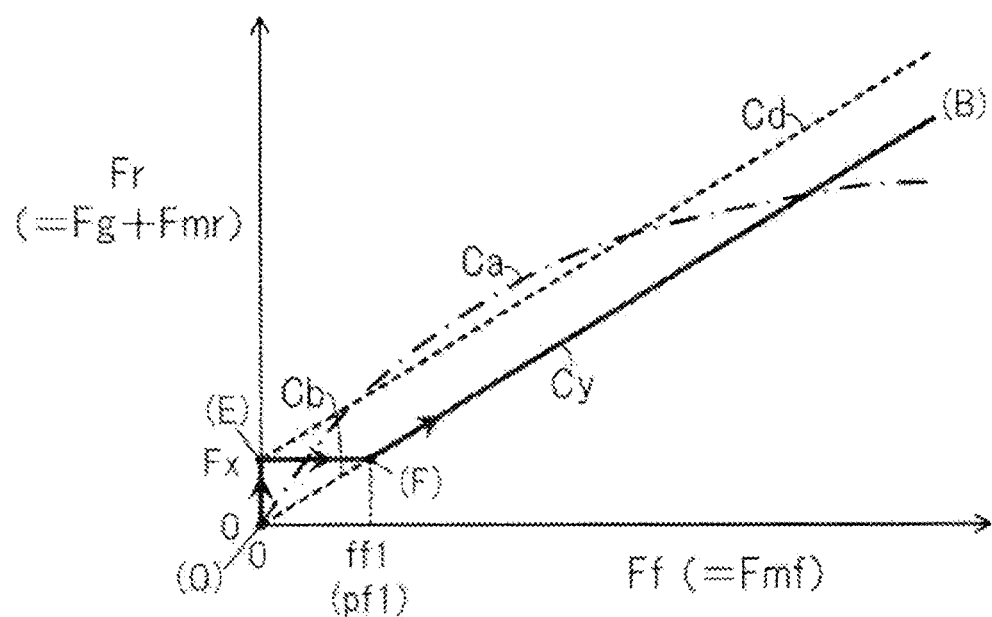
FIG. 5 is a characteristic diagram for explaining a transition of the braking force F in the second embodiment.

The front-rear distribution of the braking force F in the regenerative coordination control corresponding to the second embodiment will be described with reference to a characteristic diagram of FIG. 5. The characteristic diagram shows the relationship between the front wheel braking force Ff (=Fmf) based on only the friction braking force Fp and the rear wheel braking force Fr (=Fg+Fmr) including the regenerative braking force Fg. Similar to the above, the characteristic Ca indicated by the chain dashed line is a diagram of the ideal braking force distribution. The reference characteristic Cb is a mutual relationship between the front wheel braking force Ff and the rear wheel braking force Fr when "Fg=0". The reference characteristic Cb depends on the pressure receiving area of the wheel cylinder, the effective braking radius, and the friction coefficient of the friction material. Using the front wheel and rear wheel ratios Hf and Hr, the slope "Fr/Ff" of the reference characteristic Cb is expressed by "Hr/Hf=H(1−Hf)/Hf=Hr/(1−Hr)".

At the initial stage of braking (state of "Fd≤Fx"), the vehicle deceleration is satisfied only by the regenerative braking force Fg, and thus the friction braking forces Fmf and Fmr are not generated and remain "0". Therefore, the rear wheel braking force Fr is increased from "0" only by the regenerative braking force Fg according to an increase in the braking operation amount Ba. The operating point of the braking force F transitions from the origin (O) to point (E). When the braking operation amount Ba is increased and the regenerative braking force Fg is insufficient with respect to the required braking force Fd (i.e., "Fd>Fx"), the increase of the front wheel friction braking force Fmf is started according to the complementary braking force Fh (=Fd−Fx). At this time, the maximum regenerative force Fx slightly increases according to the vehicle deceleration, and the rear wheel friction braking force Fmr is maintained at "0". Therefore, the operating point changes from point (E) to point (F) substantially parallel to the X-axis. Furthermore, when the braking operation amount Ba is increased and the front wheel reference force Ft (=Hf×Fd) is insufficient with respect to the complementary braking force Fh (i.e., "Fh>Ft"), the increase of the rear wheel friction braking force Fmr is started based on the rear wheel instruction force Fq. Here, the rear wheel instruction force Fq is a value obtained by subtracting the front wheel reference force Ft from the complementary braking force Fh (i.e., "Fq=Fh−Ft"). The operating point changes from point (F) toward point (B) on the reference characteristic Cb. The braking force distribution characteristic Cy (transition of the operating point of the braking force F) according to the second embodiment changes as "(O)→(E)→(F)→(B)" as the braking operation amount Ba increases.

In the braking control device SC, the front wheel target liquid pressure Ptf is calculated based on the front wheel friction braking force (target value) Fmf, and based on this, the first adjusted liquid pressure Pb is adjusted by the first pressure adjusting valve UB, and ultimately, the front wheel braking liquid pressure Pwf is controlled. Furthermore, the rear wheel target liquid pressure Ptr is calculated based on the rear wheel friction braking force Fmr, and based on this, the second adjusted liquid pressure Pc is adjusted by the second pressure adjusting valve UC, and ultimately, the rear wheel braking liquid pressure Pwr is controlled. When the braking operation is started, until the regenerative braking force Fg reaches the maximum regenerative force Fx (between point O and point E), it is controlled to "Pb=Pc=0" based on "Ptf=Ptr=0", and set to "Pwf=Pwr=0". At this time, the electric pump DC is rotating because it is determined that braking is being performed. At a time point the regenerative braking force Fg reaches the maximum regenerative force Fx (corresponds to point E), the state of "Ptr=0" is maintained and the front wheel target liquid pressure Ptf starts to increase from "0". As a result, "Pc=0" is maintained, the increase of the first adjusted liquid pressure Pb is started, and the front wheel braking liquid pressure Pwf is increased. Furthermore, at a time point the complementary braking force Fh exceeds the front wheel reference force Ft (corresponds to point F, time point when the front wheel braking liquid pressure Pwf reaches the liquid pressure pf1 corresponding to the predetermined braking force ff1), the rear wheel target liquid pressure Ptr is increased from "0", and the increase of the second adjusted liquid pressure Pc (i.e., the rear wheel braking liquid pressure Pwr) is started. Thereafter, while taking into consideration the predetermined front-rear ratio (e.g., the front wheel ratio Hf) so that the operating point of the braking force F lies along the reference characteristic Cb, the front wheel and rear wheel target liquid pressures Ptf, Ptr are increased, and the first and second adjusted liquid pressures Pb and Pc are increased.

For example, in a configuration in which the same liquid pressure is always introduced to all of the wheel cylinders CW (e.g., when the first adjusted liquid pressure Pb and the second adjusted liquid pressure Pc are not individually adjusted), the braking force distribution in the regenerative coordination control changes like the characteristic Cd. The rear wheel braking force Fr in the characteristic Cd is larger than the rear wheel braking force Fr in the ideal distribution characteristic Ca. Therefore, in the characteristic Cd, the rear wheel braking force Fr is sufficiently utilized, but there is a concern about vehicle stability. In the braking control device SC according to the present invention, the front wheel ratio Hf is taken into consideration, the front wheel and rear wheel friction braking forces (target values) Fmf, Fmr are calculated, and the first and second adjusted liquid pressures Pb, Pc (i.e., front wheel and rear wheel braking liquid pressures Pwf, Pwr) are independently adjusted to achieve the same. According to the distribution characteristic Cy based on such an adjustment, the regeneration amount Rg of the generator GN can be maximized and the front-rear distribution of the braking force F can be optimized. Thus, the distribution of the braking forces Ff and Fr of the front and rear wheels is suitably adjusted, and both maintaining of vehicle deceleration and vehicle stability, and ensuring of regenerative energy can be achieved.

When Generators GNf, GNr are Provided on Both Front Wheel WHf and Rear Wheel WHr A case where the generator GN is provided on either the front wheel WHf or the rear wheel WHr has been described above. That is, the vehicle includes a front wheel regenerative generator GNf for front wheels WHf and a rear wheel regenerative generator GNr for rear wheels WHr. In this case, based on which of the front wheel regenerative braking force Fgf and the rear wheel regenerative braking force Fgr first reaches the corresponding maximum regenerative force (regenerative limit) Fxf, Fxr, the destination to where the first and second adjusted liquid pressures Pb and Pc are introduced is determined.

In a vehicle in which the rear wheel regenerative braking force Fgr reaches the rear wheel maximum regenerative force Fxr before the front wheel regenerative braking force Fgf reaches the front wheel maximum regenerative force Fxf, the braking control device SC according to the first embodiment is adopted (see FIG. 1). That is, the first adjusted liquid pressure Pb is introduced into the rear wheel cylinder CWr, and the second adjusted liquid pressure Pc is introduced into the servo chamber Rs. In this configuration, as the braking operation amount Ba increases, the state transition occurs in the order of "braking only by the front wheel and rear wheel regenerative braking forces Fgf, Fgr"→"braking by the front wheel and rear wheel regenerative braking forces Fgf, Fgr and rear wheel friction braking force Fmr (i.e., "Fmf=0")"→"braking by front wheel and rear wheel regenerative braking forces Fgf, Fgr and front wheel and rear wheel friction braking forces Fmf, Fmr". For example, in such a vehicle, the power generation capacity (regenerative performance) of the front wheel generator GNf is larger than the power generation capacity of the rear wheel generator GNr, and the front wheel regenerative braking force Fgf is relatively larger than the rear wheel regenerative braking force Fgr.

Figure 4:
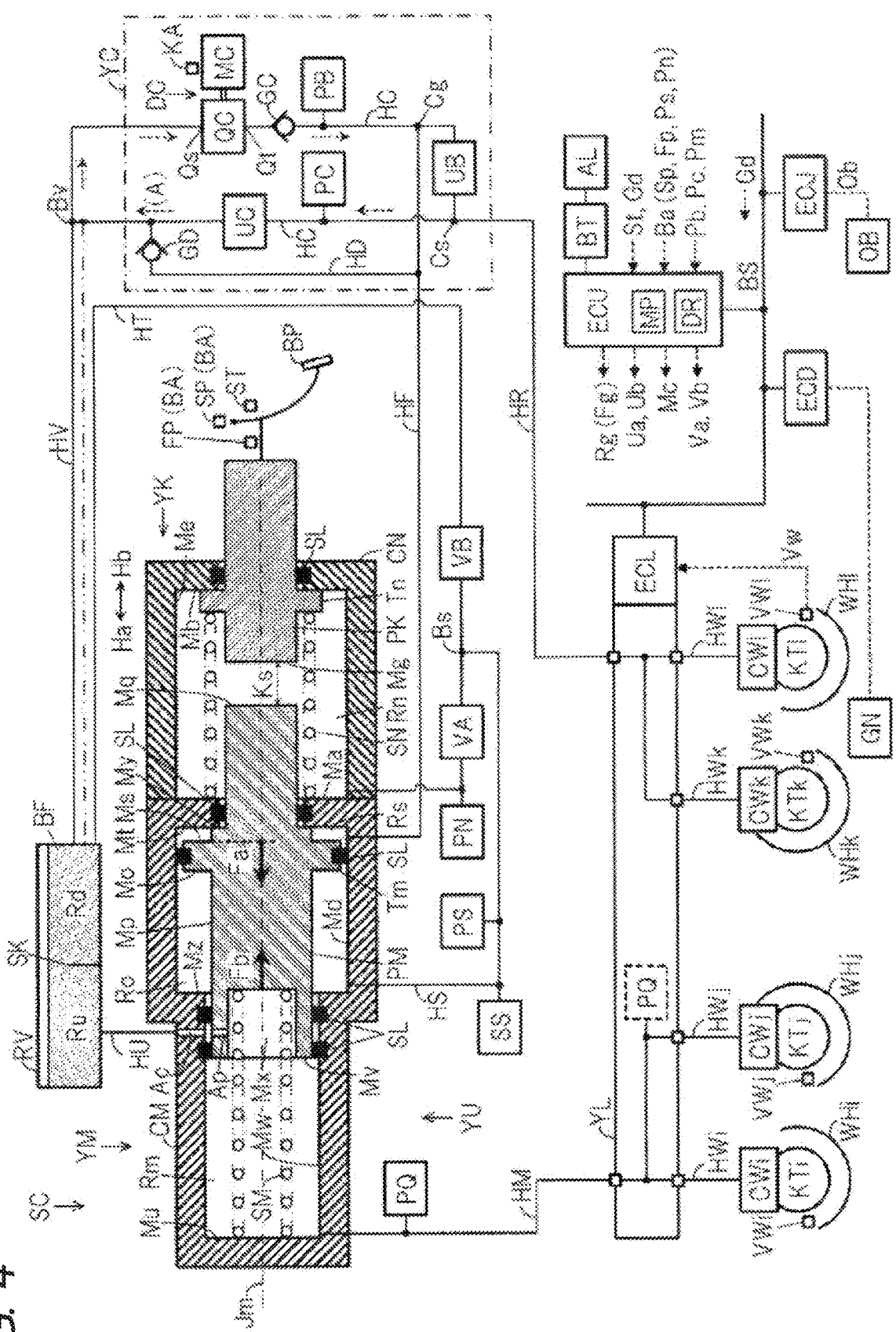
FIG. 4 is an overall configuration view for describing a second embodiment of a braking control device SC for a vehicle according to the present invention.

On the contrary, in a vehicle in which the front wheel regenerative braking force Fgf reaches the front wheel maximum regenerative force Fxf before the rear wheel regenerative braking force Fgr reaches the rear wheel maximum regenerative force Fxr, the braking control device SC according to the second embodiment is adopted (see FIG. 4). That is, the second adjusted liquid pressure Pc is introduced into the rear wheel cylinder CWr, and the first adjusted liquid pressure Pb is introduced into the servo chamber Rs. In this configuration, as the braking operation amount Ba increases, the state transition occurs in the order of "braking only by the front wheel and rear wheel regenerative braking force Fgf, Fgr"→"braking by the front wheel and rear wheel regenerative braking forces Fgf, Fgr, and the front wheel friction braking force Fmf (i.e., "Fmr=0")"→"braking by the front wheel and rear wheel regenerative braking forces Fgf, Fgr and the front wheel and rear wheel friction braking forces Fmf, Fmr". For example, a vehicle in which the power generation capacity of the rear wheel generator GNr is larger than the power generation capacity of the front wheel generator GNf and the rear wheel regenerative braking force Fgr is relatively larger than the front wheel regenerative braking force Fgf is applicable.

As described above, even when the generators GNf and GNr are provided on both the front and rear wheels WHf and WHr, the front wheel and rear wheel braking liquid pressures Pwf and Pwr are independently and individually adjusted by the two pressure adjusting valves UB and UC arranged in series, and thus the regeneration amounts of the front wheel and rear wheel generators GNf and GNr are sufficiently ensured. In addition, since the front-rear distribution of the braking force F of the entire vehicle is optimized, both deceleration and stability of the vehicle can be achieved.

Operation/Effect

The operations and effects of the braking control device SC according to the present invention will be summarized.

A front wheel WHf of a vehicle equipped with the braking control device SC is provided with a regenerative generator GN (front wheel generator GNf). In this vehicle, the rear wheel WHr is not provided with a regenerative generator. Alternatively, the rear wheel WHr of the vehicle is also provided with the generator GNr. In this case, in the regenerative capacity of the front wheel and rear wheel generators GNf, GNr, the regenerative braking force Fgr by the rear wheel generator GNr reaches the rear wheel maximum regenerative force (limit value) Fxr before (in advance) the regenerative braking force Fgf by the front wheel generator GNf reaches the front wheel maximum regenerative force (limit value) Fxf. The braking control device SC is formed by a master unit YM, a pressure adjustment unit YC, and a regenerative coordination unit YK.

The master unit YM includes a master cylinder CM and a master piston PM. The master unit YM includes the "master chamber Rm connected to the front wheel cylinder CWf of the vehicle", and the "servo chamber Rs that applies a forward force Fa opposing the reverse force Fb applied to the master piston PM by the master chamber Rm to the master piston PM". The pressure adjustment unit YC includes an electric pump DC and first and second solenoid valves UB, UC. In the pressure adjustment unit YC, the brake fluid BF discharged by the electric pump DC is adjusted to the first liquid pressure Pb by the first solenoid valve UB, which first liquid pressure Pb is introduced into the rear wheel cylinder CWr. Furthermore, in the pressure adjustment unit YC, the second solenoid valve UC adjusts the first liquid pressure Pb to decrease to the second liquid pressure Pc, which second liquid pressure Pc is introduced into the servo chamber Rs. The regenerative coordination unit YK includes the input piston PK that operates in conjunction with the braking operation member BP of the vehicle and the input cylinder CN fixed to the master cylinder CM. In the regenerative coordination unit YK, the gap Ks between the master piston PM and the input piston PK is controlled by the second liquid pressure Pc. Thus, regenerative coordination control (e.g., control in which the braking operation member BP is operated but the braking liquid pressure Pw is not generated) is achieved.

For example, in a vehicle in which the generator GNf is provided only on the front wheels WHf, the required braking force Fd determined based on at least one of the braking operation amount Ba and the required deceleration Gd, and the maximum regenerative force (upper limit of regenerative force) Fx determined based on the vehicle body speed Vx (i.e., rotation number of the generator GNf) are compared. When the required braking force Fd is less than or equal to the maximum regenerative force Fx, the first and second adjusted liquid pressures Pb and Pc are controlled to "0", and the vehicle is decelerated only by the front wheel generator GNf. Then, when the required braking force Fd is larger than the maximum regenerative force Fx, at least the first adjusted liquid pressure Pb is adjusted to be larger than "0". At this time, when the complementary braking force Fh (value obtained by subtracting the maximum regenerative force Fx from the required braking force Fd) is less than or equal to the rear wheel reference force Fs (value obtained by multiplying the required braking force Fd by a predetermined rear wheel ratio Hr), the second adjusted liquid pressure Pc is maintained at "0". However, when the complementary braking force Fh is larger than the rear wheel reference force Fs, the second adjusted liquid pressure Pc is also adjusted to a value larger than "0". In this way, the first adjusted liquid pressure Pb and the second adjusted liquid pressure Pc are adjusted individually and independently of the braking operation amount Ba (or the required deceleration Gd). Therefore, the braking liquid pressure Pwf of the front wheel system and the braking liquid pressure Pwr of the rear wheel system can be controlled separately and can be controlled independently of the braking operation amount Ba (or the required deceleration Gd). Thus, the distribution ratio of the front wheel and rear wheel braking forces Ff, Fr is optimized, the vehicle stability is maintained, and the regeneratable energy amount can be sufficiently ensured.

The braking control device SC can also be applied to a vehicle in which the rear wheel WHr is provided with the regenerative generator GN (rear wheel generator GNr). For example, in this vehicle, a regenerative generator is not provided on the front wheels WHf. Alternatively, the generator GNf is also provided on the front wheels WHf, hut in the regenerative capacity of two rear wheel generators GNf, GNr, the regenerative braking force Fgf by the front wheel generator GNf reaches the front wheel maximum regenerative force (limit value) Fxf before the regenerative braking force Fgr by the rear wheel generator GNr reaches the rear wheel maximum regenerative force (limit value) Fxr. Similar to the above, the braking control device SC includes a master unit YM, a pressure adjust unit YC, and a regenerative coordination unit YK.

The master unit YM is configured by a master cylinder CM and a master piston PM, and the master unit YM includes the "master chamber Rm connected to the front wheel cylinder CWf of the vehicle" and the "servo chamber Rs that applies a forward force Fa opposing the reverse force Fb applied to the master piston PM by the master chamber Rm to the master piston PM". The pressure adjustment unit YC includes an electric pump DC and first and second solenoid valves UB, UC. In the pressure adjustment unit YC, the brake fluid BF discharged by the electric pump DC is adjusted to the first liquid pressure Pb by the first solenoid valve UB, which first liquid pressure Pb is introduced into the servo chamber Rs. Furthermore, in the pressure adjustment unit YC, the second solenoid valve UC adjusts the first liquid pressure Pb to decrease to the second liquid pressure Pc, which second liquid pressure Pc is introduced into the rear wheel cylinder CWr. The regenerative coordination unit YK is configured by an input piston PK that operates in conjunction with the braking operation member BP of the vehicle and an input cylinder CN that is fixed to the master cylinder CM, and the gap Ks between the master piston PM and the input piston PK is controlled by the first liquid pressure Pb.

For example, even in a vehicle in which the generator GNr is provided only on the rear wheels WHr, when the required braking force Fd is less than or equal to the maximum regenerative force Fx, the first and second adjusted liquid pressures Pb, Pc are controlled to "0", and the vehicle is decelerated only by the rear wheel generator GNr. Then, when the required braking force Fd is larger than the maximum regenerative force Fx, at least the first adjusted liquid pressure Pb is adjusted to be larger than "0". At this time, when the complementary braking force Fh is less than or equal to the front wheel reference force Ft (value obtained by multiplying the required braking force Fd by a predetermined front wheel ratio Hf), the second adjusted liquid pressure Pc is maintained at "0". However, when the complementary braking force Fh is larger than the front wheel reference force Ft, the second adjusted liquid pressure Pc is also adjusted to a value larger than "0". Similar to the above, the first adjusted liquid pressure Pb and the second adjusted liquid pressure Pc are adjusted independently and individually from the braking operation amount Ba (or the required deceleration Gd), and hence the distribution ratio of the front wheel and rear wheel braking forces Ff and Fr is optimized, the vehicle stability is maintained, and regeneratable energy amount can be sufficiently ensured.

The first solenoid valve UB and the second solenoid valve UC are arranged in series on the reflux path of the brake fluid BF including the electric pump DC (fluid passage formed by the first reservoir fluid passage HV and the pressure adjusting fluid passage HC in which the flow of the brake fluid BF again returns to the original flow). Specifically, the first solenoid valve UB is located closer to the electric pump DC than the second solenoid valve UC. That is, the electric pump DC, the first solenoid valve UB, and the second solenoid valve UC are arranged in this order in the direction of the flow of the brake fluid BF in the reflux path. Thus, the second adjusted liquid pressure Pc is adjusted to a pressure less than equal to the first adjusted liquid pressure Pb.

Other Embodiments

Other embodiments will be described below. In other embodiments as well, similar effects as described above (ensuring the vehicle stability control and increasing the energy regeneration amount by optimizing the braking force distribution, etc.) can be obtained.

In the embodiments described above, the linear type pressure adjusting valves UB, UC are employed in which the valve opening amount is adjusted in accordance with the energization amount. For example, although the pressure adjusting valves UB, UC are on/off valves, the opening and closing of the valves may be controlled by a duty ratio and the liquid pressure may be linearly controlled.

In the embodiments described above, the configuration of the disc type braking device (disc brake) has been exemplified. In this case, the friction member is a brake pad and the rotating member is a brake disc. Instead of the disc type braking device, a drum type braking device (drum brake) can be adopted, in a case where a drum brake is adopted, a brake drum is adopted in place of the caliper. The friction member is a brake shoe, and the rotating member is a brake drum.

In the embodiments described above, the upper fluid unit YU and the lower fluid unit YL are configured separately. The upper fluid unit YU and the lower fluid unit YL may be integrally formed. In this case, the lower controller ECL is included in the upper controller ECU.

In the embodiments described above, the pressure adjusting fluid passage HC is connected to the first reservoir fluid passage HV at the portion Bv to form the reflux path. The pressure adjusting fluid passage HC is connected to the reservoir RV (particularly, the pressure adjusting reservoir chamber Rd), and the reflux path can be formed to include the reservoir RV (see the fluid passage shown by the chain double-dashed line in FIGS. 1 and 4). With this configuration, suction of gas by the fluid pump QC can be suppressed.

In the embodiments described above, the rear wheel reference force Fs is calculated based on the rear wheel ratio Hr. Furthermore, the front wheel reference force Ft is calculated based on the front wheel ratio Hf. However, due to the relationship of "Hf+Hr=1", the rear wheel reference force Fs may be calculated based on the front wheel ratio Hf, or the front wheel reference force Ft may be calculated based on the rear wheel ratio Hr. That is, the front wheel and rear wheel reference forces Ft, Fs can be calculated based on a predetermined front-rear distribution ratio (Hf, Hr) set in advance.

In the embodiments described above, the first and second adjusted liquid pressure sensors PB and PC are provided in the pressure adjusting fluid passage HC so as to detect the first and second adjusted liquid pressures Pb and Pc. A master liquid pressure sensor PQ may be used instead of the first and second adjusted liquid pressure sensors PB and PC. Specifically, in the first embodiment, the second adjusted liquid pressure sensor PC is omitted, and the actual second adjusted liquid pressure Pc can be calculated based on the detected value Pm of the master liquid pressure sensor PQ. Furthermore, in the second embodiment, the first adjusted liquid pressure sensor PB is omitted, and the actual first adjusted liquid pressure Pb can be calculated based on the detected value Pm of the master liquid pressure. This is because the specifications of the master piston PM and the master cylinder CM are known. For example, when the pressure receiving area rs of the servo chamber Rs and the pressure receiving area rm of the master chamber Rm are equal, the relationship of "Pm=Pc" or "Pm=Pb" is established.

In the embodiments described above, after the determination that "braking is being performed", the first open/close valve VA is set to the open position and the second open/close valve VB is set to the closed position. In place thereof, when the ignition switch of the vehicle is turned on, the first open/close valve VA may be set to the open position and the second open/close valve VB may be set to the closed position. That is, while the vehicle is traveling, the first and second open/close valves VA, VB are always energized. Since the on/off states of the first and second open/close valves VA and VB cannot be switched each time braking is performed, this is advantageous in terms of operating noise and the characteristics of the simulator SS can be stabilized.

The invention claimed is:

1. A braking control device for a vehicle in which a regenerative generator is provided on a front wheel of the vehicle, the braking control device for the vehicle comprising:
    a master unit configured by a master cylinder and a master piston, and includes a master chamber connected to a front wheel cylinder of the vehicle and a servo chamber that applies a forward force opposing a reverse force applied to the master piston by the master chamber to the master piston;
    a pressure adjustment unit configured by an electric pump and first and second solenoid valves, and that adjusts a brake fluid discharged by the electric pump to a first liquid pressure by the first solenoid valve and introduces the first liquid pressure to a rear wheel cylinder of the vehicle, and adjusts the first liquid pressure to decrease to a second liquid pressure by the second solenoid valve and introduces the second liquid pressure to the servo chamber; and
    a regenerative coordination unit configured by an input piston that operates in conjunction with a braking operation member of the vehicle and an input cylinder fixed to the master cylinder, and in which a gap between the master piston and the input piston is controlled by the second liquid pressure.

2. The braking control device for the vehicle according to claim 1, wherein the second solenoid valve is arranged in series with respect to the first solenoid valve in a reflux path of the brake fluid including the electric pump.

3. A braking control device for a vehicle in which a regenerative generator is provided on a rear wheel of the vehicle, the braking control device for the vehicle comprising:
    a master unit configured by a master cylinder and a master piston, and includes a master chamber connected to a front wheel cylinder of the vehicle and a servo chamber that applies a forward force opposing a reverse force applied to the master piston by the master chamber to the master piston;
    a pressure adjustment unit configured by an electric pump and first and second solenoid valves, and that adjusts a brake fluid discharged by the electric pump to a first liquid pressure by the first solenoid valve and introduces the first liquid pressure to the servo chamber, and adjusts the first liquid pressure to decrease to a second liquid pressure by the second solenoid valve and introduces the second liquid pressure to a rear wheel cylinder of the vehicle; and
    a regenerative coordination unit configured by an input piston that operates in conjunction with a braking operation member of the vehicle and an input cylinder fixed to the master cylinder, and in which a gap between the master piston and the input piston is controlled by the first liquid pressure.

4. The braking control device for the vehicle according to claim 3, wherein the second solenoid valve is arranged in series with respect to the first solenoid valve in a reflux path of the brake fluid including the electric pump.

* * * * *